United States Patent
Tajima et al.

(10) Patent No.: US 8,355,304 B2
(45) Date of Patent: Jan. 15, 2013

(54) OPTICAL INFORMATION RECORDING MEDIUM, REPRODUCING DEVICE FOR OPTICAL INFORMATION RECORDING MEDIUM, CONTROL METHOD AND CONTROL PROGRAM FOR THE REPRODUCING DEVICE, AND MEDIUM WITH THE CONTROL PROGRAM RECORDED THEREIN

(75) Inventors: Hideharu Tajima, Nara (JP); Masaki Yamamoto, Nara (JP); Go Mori, Nara (JP); Nobuyuki Takamori, Nara (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 12/814,314

(22) Filed: Jun. 11, 2010

(65) Prior Publication Data
US 2010/0246352 A1 Sep. 30, 2010

Related U.S. Application Data

(62) Division of application No. 12/224,706, filed as application No. PCT/JP2007/054229 on Mar. 5, 2007.

(30) Foreign Application Priority Data

Mar. 3, 2006 (JP) ................................ 2006-058594
Mar. 2, 2007 (JP) ................................ 2007-053475

(51) Int. Cl.
*G11B 7/00* (2006.01)

(52) U.S. Cl. .................... 369/53.22; 369/47.27; 369/116

(58) Field of Classification Search ............... 369/53.22, 369/47.1, 275.3, 275.2, 47.27, 116, 47.51, 369/47.52, 47.53
See application file for complete search history.

(56) References Cited

U.S. PATENT DOCUMENTS

| | | | |
|---|---|---|---|
| 4,940,618 A | 7/1990 | Hamada et al. | |
| 4,990,388 A | 2/1991 | Hamada et al. | |
| 5,109,373 A | 4/1992 | Ohno et al. | |
| 5,150,351 A | 9/1992 | Ohno et al. | |
| 5,155,723 A | 10/1992 | Hamada et al. | |
| 5,448,552 A * | 9/1995 | Onagi | ......................... 369/275.4 |
| 5,659,537 A | 8/1997 | Hirokane et al. | |
| 5,886,973 A | 3/1999 | Iida | |
| 6,143,468 A | 11/2000 | Ohno et al. | |
| 6,294,310 B1 | 9/2001 | Ohno et al. | |

(Continued)

FOREIGN PATENT DOCUMENTS

JP 2-132649 A 5/1990

(Continued)

OTHER PUBLICATIONS

Tominage, J. et al.,"An approach for recording and readout beyond the diffraction limit with an Sb thin film," Applied Physics Letters, vol. 73, No. 15, Oct. 12, 1998, p. 2078-2080.

(Continued)

*Primary Examiner* — Nabil Hindi
(74) *Attorney, Agent, or Firm* — Edwards Wildman Palmer LLP; David G. Conlin; Edmund J. Koundakjian

(57) ABSTRACT

A super-resolution medium (1) has a medium identification information for specifying a type of medium recorded in a medium information area (3) by use of pre-pits having a length not shorter than a length of a resolution limit of an optical system in a reproducing device (10).

2 Claims, 10 Drawing Sheets

U.S. PATENT DOCUMENTS

| | | |
|---|---|---|
| 6,449,231 B1 | 9/2002 | Numata |
| 6,965,556 B1 | 11/2005 | Kikukawa et al. |
| 7,245,576 B2 | 7/2007 | Ichihara et al. |
| 7,474,599 B2 | 1/2009 | Yamanaka |
| 7,499,389 B2 | 3/2009 | Kim et al. |
| 2001/0049074 A1 | 12/2001 | Ohno et al. |
| 2002/0027869 A1 | 3/2002 | Morita et al. |
| 2003/0002429 A1 | 1/2003 | Morita |
| 2004/0095877 A1* | 5/2004 | Osakabe ............... 369/125 |
| 2004/0184396 A1 | 9/2004 | Lee et al. |
| 2004/0190432 A1 | 9/2004 | Ichihara et al. |
| 2005/0117478 A1 | 6/2005 | Kuwahara et al. |
| 2005/0128931 A1 | 6/2005 | Kim et al. |
| 2005/0141377 A1 | 6/2005 | Yamanaka |
| 2005/0157631 A1 | 7/2005 | Lee et al. |
| 2005/0163026 A1 | 7/2005 | Oshima et al. |
| 2005/0237912 A1 | 10/2005 | Kikukawa et al. |
| 2005/0270959 A1* | 12/2005 | Iwasa et al. ............ 369/116 |
| 2006/0098559 A1 | 5/2006 | Hino et al. |
| 2006/0280895 A1* | 12/2006 | Kikukawa et al. ........ 428/64.4 |
| 2006/0280896 A1* | 12/2006 | Kikukawa et al. ........ 428/64.4 |
| 2007/0030795 A1 | 2/2007 | Kikuawa et al. |
| 2007/0116917 A1 | 5/2007 | Kim et al. |
| 2010/0027397 A1 | 2/2010 | Vlutters et al. |
| 2010/0061218 A1 | 3/2010 | Miura |

FOREIGN PATENT DOCUMENTS

| | | |
|---|---|---|
| JP | 3-185628 A | 8/1991 |
| JP | 5-67348 A | 3/1993 |
| JP | 5-101540 A | 4/1993 |
| JP | 5-151571 A | 6/1993 |
| JP | 6-60421 A | 3/1994 |
| JP | 6-176367 A | 6/1994 |
| JP | 7-14167 A | 1/1995 |
| JP | 7-73506 A | 3/1995 |
| JP | 2007-073506 A | 3/1995 |
| JP | 7-220284 A | 8/1995 |
| JP | 2007-220284 A | 8/1995 |
| JP | 8-7275 A | 1/1996 |
| JP | 9-71049 A | 3/1997 |
| JP | 9-320094 A | 12/1997 |
| JP | 10-112063 A | 4/1998 |
| JP | 11-240250 A | 9/1999 |
| JP | 2000-123422 A | 4/2000 |
| JP | 2000-173124 A | 6/2000 |
| JP | 2001-35012 A | 2/2001 |
| JP | 2002-260241 A | 9/2002 |
| JP | 2003-016697 A | 1/2003 |
| JP | 200330849 A | 1/2003 |
| JP | 2003-77193 A | 3/2003 |
| JP | 2003-323723 A | 11/2003 |
| JP | 2004112100 A | 4/2004 |
| JP | 2004-234719 A | 8/2004 |
| JP | 2005-044421 A | 2/2005 |
| JP | 2005-078782 A | 3/2005 |
| JP | 2005-93063 A | 4/2005 |
| JP | 2005-135538 A | 5/2005 |
| JP | 2005-209322 A | 8/2005 |
| JP | 2006-085863 A | 3/2006 |
| JP | 2006520990 T | 9/2006 |
| JP | 2006-344256 A | 12/2006 |
| JP | 2007519143 T | 7/2007 |
| WO | WO02/19322 A1 | 3/2002 |
| WO | WO 02/019322 A1 | 3/2002 |
| WO | WO-02/058060 A1 | 7/2002 |
| WO | WO-2004/029943 A1 | 4/2004 |
| WO | 2004084200 A1 | 9/2004 |
| WO | 2005064601 A1 | 7/2005 |

OTHER PUBLICATIONS

International Search Report for the corresponding international application No. PCT/JP2007/054229 dated Jun. 5, 2007.
International Search Report dated Oct. 27, 2008, for the corresponding International Application No. PCT/JP2008/065376.
U.S. Appl. No. 12/675,557, filed Feb. 26, 2010.
US Office Action dated Oct. 4, 2010 for U.S. Appl. No. 12/224,706.
Office Action dated Dec. 21, 2010, for co-pending U.S. Appl. No. 12/814,331.
Office Action dated Jan. 11, 2011, for corresponding U.S. Appl. No. 12/814,342.
Office Action dated Feb. 4, 2011, for corresponding U.S. Appl. No. 12/814,354.
An Office Action dated Feb. 18, 2011, for corresponding U.S. Appl. No. 12/814,362.
An Office Action in co-pending U.S. Appl. No. 12/814,342, mailed Jul. 11, 2011.
An Office Action in co-pending U.S. Appl. No. 12/814,362, mailed Jul. 20, 2011.
Office Action from co-pending U.S. Appl. No. 12/224,706, mailed May 17, 2011.
Office Action from co-pending U.S. Appl. No. 12/814,331, mailed Jun. 8, 2011.
Office Action from co-pending U.S. Appl. No. 12/814,354, mailed Jun. 22, 2011.
Office Action dated Nov. 7, 2011 from co-pending U.S. Appl. No. 12/814,331.
Office Action dated Nov. 8, 2011 from co-pending U.S. Appl. No. 12/224,706.
Office Action dated Nov. 21, 2011 from co-pending U.S. Appl. No. 12/814,354.
Office Action dated Dec. 29, 2011 from co-pending U.S. Appl. No. 12/814,362.
Office Action dated Dec. 29, 2011 from co-pending U.S. Appl. No. 12/814,342.
Advisory Action dated Jan. 26, 2012 from co-pending U.S. Appl. No. 12/224,706.
Advisory Action dated Jan. 26, 2012 from co-pending U.S. Appl. No. 12/814,331.
Advisory Action dated Feb. 6, 2012 from co-pending U.S. Appl. No. 12/814,354.
An Office Action dated Sep. 26, 2012 in a corresponding U.S. Appl. No. 12/814,331.
An Office Action dated Nov. 2, 2012, in corresponding U.S. Appl. No. 12/814,342.
An Office Action dated Nov. 6, 2012, in corresponding U.S. Appl. No. 12/814,362.

* cited by examiner

F I G. 7 (a)
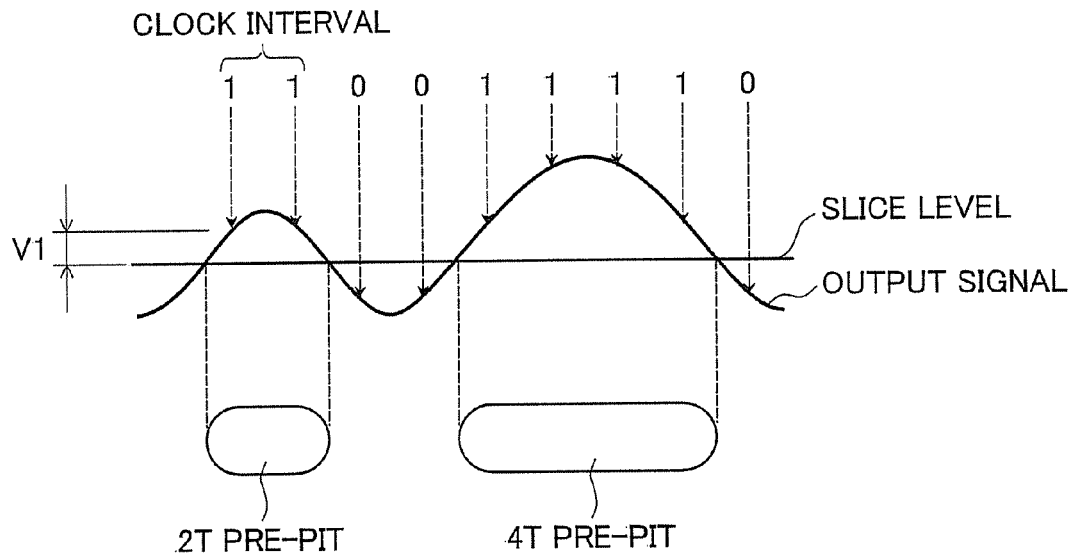
F I G. 7 (b)
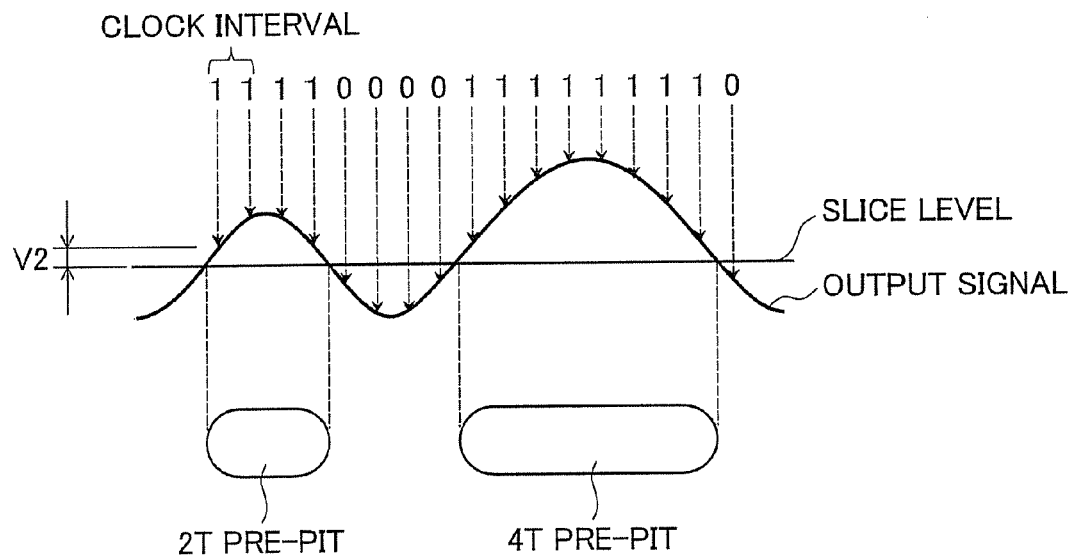

-- Conventional Art --

-- Conventional Art --

-- Conventional Art --

-- Conventional Art --

-- Conventional Art --

OPTICAL INFORMATION RECORDING MEDIUM, REPRODUCING DEVICE FOR OPTICAL INFORMATION RECORDING MEDIUM, CONTROL METHOD AND CONTROL PROGRAM FOR THE REPRODUCING DEVICE, AND MEDIUM WITH THE CONTROL PROGRAM RECORDED THEREIN

CROSS-REFERENCE TO RELATED APPLICATIONS

This application is a divisional of U.S. Ser. No. 12/224,706, filed Sep. 3, 2008 which is a national stage application pursuant to 35 U.S.C. §371 of PCT International Application No. PCT/JP2007/054229, filed Mar. 5, 2007, which claims priority to Japanese patent application no. 2006-058594, filed Mar. 3, 2006 and Japanese patent application no. 2007-053475, filed Mar. 2, 2007. The contents of these applications are incorporated herein by reference in their entirety.

TECHNICAL FIELD

The present invention relates to an optical information recording medium in which information is to be recorded, a reproducing device for the optical information recording medium, a control method and a control program for the reproducing device, and a recording medium with the control program recorded therein.

BACKGROUND ART

Recently, in order to process a massive amount of information such as images, enhancement in information density has been sought for in recording and reproduction of an optical information recording medium. In view of this, super-resolution techniques have been proposed, which record and reproduce information by use of recording marks, or pre-pits that are formed by concave portions and/or protrusions, each of which lengths of the marks or the pre-pits are shorter than a resolution limit of an optical system in a reproducing device. In the description, an optical information recording medium which is reproducible by the super-resolution technique is referred to as a "super-resolution medium" or a "super-resolution optical information recording medium", whereas an optical information recording medium which cannot utilize the super-resolution technique, that is, an optical information recording medium which records information by use of recording marks or pre-pits, each of which have a length longer than a resolution limit of an optical system in a reproducing device, is referred to as a "regular medium" or a "regular optical information recording medium". The resolution limit of an optical system is determined based on a wavelength of a reproduction laser and a numerical aperture of an optical system.

Optical information recording mediums disclosed in Patent Documents 1 through 3 are examples of the super-resolution medium.

A rewritable super-resolution medium described in Patent Document 1 provides a recording layer and a reproduction layer. The recording layer has information recorded thereon in a perpendicular magnetizing direction, and the reproduction layer is provided on the recording layer. Reproduction of the information is carried out by having reproduction laser light irradiated to the reproduction layer. Irradiation of the reproduction laser light to the reproduction layer causes a laser spot to generate. The laser spot thus generated has a light intensity distribution, whereby a temperature distribution is induced in the laser spot. A magnetic field of the recording layer is transferred to the reproduction layer, to just parts of the laser spot having a high temperature. This allows reproduction of a signal having a shorter marking length than the resolution limit of the optical system.

In a super-resolution medium described in Patent Document 2, a thermochromic pigment layer is provided as a mask layer on a surface of a reflection layer on which reproduction light is incident thereon. The thermochromic pigment layer changes in optical characteristic such as transmittance, depending on temperature. The mask layer is a layer which causes a super-resolution phenomenon, such as reducing a size of a laser spot in a pseudo manner. Distribution of transmittance is generated due to a temperature distribution induced by a light intensity distribution in the laser spot on the reproduction layer, near a surface of the reproduction layer on which the reproduction light is incident thereon. For example, when a material which improves in transmittance along with an increase in temperature is used as the reproduction layer, transmittance is improved in just parts having a high temperature, thereby causing the laser spot generated on the surface of the reflection layer to be reduced in a pseudo manner. This allows reproduction of a signal having a shorter marking length than the resolution limit of the optical system. The technique disclosed in Patent Document 2 is applicable not only to a rewritable optical information recording medium, but also to an optical information recording medium only for reproduction.

Furthermore, in a super-resolution medium described in Patent Document 3, information is recorded on a substrate by use of concave portions and/or protrusions. The substrate has a film layer, called a functional layer, which is made of a thin metal film or the like, provided thereon. Although substantially none of the theory of this super-resolution medium is currently known, it is known that signals which have a shorter marking length than the resolution limit of the optical system are reproducible due to a temperature change in the functional layer.

[Patent Document 1]
Japanese Unexamined Patent Publication, Tokukaihei, No. 8-180486 (published Jul. 12, 1996)
[Patent Document 2]
Japanese Unexamined Patent Publication, Tokukai, No. 2001-35012 (published Feb. 9, 2001)
[Patent Document 3]
Japanese Unexamined Patent Publication, Tokukai, No. 2001-250274 (published Sep. 14, 2001)

The following description explains a conventional regular medium 61 and a conceivable super-resolution medium 71, with reference to FIGS. 14 through 18.

FIG. 15 illustrates an outer appearance of the conventional regular medium 61. The regular medium 61 includes a data area 62, and a medium information area 63. The data area 62 is to be recorded with information to be used by a user. The medium information area 63 is recorded with information concerning the regular medium 61. The data area 62 and the medium information area 63 are arranged so that the medium information area 63 is provided at an innermost circumferential section and an outermost circumferential section of the regular medium 61, and the data area 62 is provided therebetween, as illustrated in FIG. 15. One example of the information recorded in the medium information area 63 concerning the regular medium 61 is medium identification information, which indicates itself as a regular medium.

FIG. 14 illustrates an enlarged view of section b shown in FIG. 15. The data area 62 and the medium information area 63 are recorded with respective information by use of pre-pits that are formed by concave portions and/or protrusions and that are longer than a resolution limit of an optical system in a reproducing device.

The following description explains the conceivable super-resolution medium 71. FIG. 17 illustrates an outer appearance of the super-resolution medium 71. The super-resolution medium 71 has a data area 72 and a medium information area 73. The data area 72 is recorded with information to be used by a user. The medium information area 73 is recorded with information concerning the super-resolution medium 71. The data area 72 and the medium information area 73 are arranged so that the medium information area 73 is provided at an innermost circumferential section and at an outermost circumferential section of the super-resolution medium 71, and the data area 72 is provided therebetween. One example of the information recorded in the medium information area 73 concerning the super-resolution medium 71 is medium identification information, which indicates itself as a super-resolution medium.

FIG. 18 illustrates a cross sectional view of the super-resolution medium 71. The super-resolution medium 71 includes a substrate 74, and a reflection, layer 75 and a super-resolution reproduction layer 76 layered on the substrate 74 in this order by sputtering. The super-resolution reproduction layer 76 causes a super-resolution phenomenon to occur. Furthermore, a transparent cover layer 77 is provided on the super-resolution reproduction layer 76.

FIG. 16 illustrates an enlarged view of section c shown in FIG. 17. The data area 72 and the medium information area 73 is recorded with respective information by use of pre-pits that are formed by concave portions and/or protrusions and that are shorter than a resolution limit of an optical system in a reproducing device. As such, in the super-resolution medium 71, information is recorded by a combination of pre-pits having a length shorter than the pre-pits of the regular medium 61. This allows high density recording of information, thereby allowing recording of more information.

With the super-resolution medium described in Patent Documents 1 and 2, the greater the power of the reproduction laser, the steeper the temperature distribution in the laser spot, thereby resulting in an enhancement in super-resolution effect. Even with the super-resolution medium described in Patent Document 3, although the cause is not understood, the super-resolution effect is enhanced, with greater reproduction laser power, as similar to the super-resolution mediums described in Patent Documents 1 and 2. Therefore, reproduction laser power optimum for reproducing the super-resolution medium 71 is greater than reproduction laser power optimum for reproducing the regular medium 61.

As described above, recording density of the super-resolution medium 71 is higher than recording density of the regular medium 61. Therefore, a reproduction clock width optimum for reproducing the super-resolution medium 71 is narrower than a reproduction clock width optimum for the regular medium 61.

The following considers a reproducing device having compatibility with both the regular medium 61 and the super-resolution medium 71, the reproducing device being capable of reproducing both mediums.

In order to reproduce the regular medium 61 and the super-resolution medium 71 at their most optimum state by the reproducing device, it is required to switch the reproduction laser power and a reproduction clock (this is because the reproduction laser power and the reproduction clock of each of the regular medium 61 and the super-resolution medium 71 are different, as described above). In order to do so, it is required to identify whether a medium is the regular medium 61 or the super-resolution medium 71. Such identification requires to reproduce (i) the medium identification information recorded in the medium information area 63 and (ii) the medium identification information recorded in the medium information area 73.

The identification of the medium is desirably carried out by using the reproduction laser power for the regular medium 61, in order to prevent increase in electricity consumption and breakage of the regular medium 61 caused by the high reproduction laser power for the super-resolution medium 71. However, in such a case, the medium identification information in the super-resolution medium 71 may not be reproducible, thereby causing a problem that no identification can be carried out.

It is an option that in the case the identification could not be carried out by using the reproduction laser power for the regular medium 61, the optical information recording medium to be identified is determined as the super-resolution medium 71, and accordingly the reproduction laser power and the reproduction clock are switched to the appropriate ones. However, excessive time is required since the switching of the reproduction laser power is carried out after the determination is made. As a result, a long time is required to start-up the reproducing device. Furthermore, even in a case where reproduction could not be carried out due to some kind of cause even if the optical information recording medium to be identified is the regular medium 61, the reproducing device mistakenly determines that the regular medium 61 is the super-resolution medium 71. In response to this determination, the reproduction laser power is switched from the reproduction laser power for the regular medium to the reproduction laser power for the super-resolution medium 71. As a result, this may cause a breakage problem of the regular medium 61. The start-up time of the reproducing device denotes a time period required to carry out a series of processes from arranging the optical information recording medium in the reproducing device to reproducing a data area of the optical information recording medium.

For simplification, the above description is described by limiting items which the medium identification information can identify to a regular medium and a super-resolution medium, however it is not limited to this. For example, conventionally, the medium identification information is used for identifying a type of a medium (e.g. CD, DVD, BD) and a form of a medium (e.g. R, RE, ROM).

DISCLOSURE OF INVENTION

The present invention is made in view of the problems, and an object thereof is to realize (i) a super-resolution optical information recording medium, which can be identified as a super-resolution optical information recording medium by use of reproduction laser power for a regular optical information recording medium, and (ii) an optical information recording medium reproducing device capable of reproducing both the super-resolution optical information recording medium and the regular optical information recording medium.

In the following description, a reproducing device denotes a reproducing device according to the present invention, capable of reproducing both a super-resolution optical information recording medium according to the present invention and a regular optical information recording medium.

In order to attain the object, a super-resolution optical information recording medium according to the present invention includes: a first area in which a content is to be recorded by forming recording marks, one or more of the recording marks being shorter than a length of a resolution limit of an optical system in a reproducing device; and a second area in which medium identification information for specifying a type of the medium is recorded by use of pre-pits that are formed by concave portions and/or protrusions, the pre-pits which form the medium identification information being not shorter than the resolution limit of the optical system.

According to the arrangement, medium identification information of a recordable/reproducible super-resolution optical information recording medium according to the present invention is recorded by use of pre-pits that are formed by concave portions and/or protrusions and that are not shorter than the resolution limit of the optical system. Therefore, it is possible to reproduce the medium identification information by use of reproduction laser power optimum for a regular optical information recording medium. Thus, it is possible to realize a super-resolution optical information recording medium capable of identifying the optical information recording medium as a super-resolution optical information recording medium by use of reproduction laser power optimum for a regular optical information recording medium.

In order to attain the object, a super-resolution optical information recording medium according to the present invention includes: a first area in which a content is to be recorded by forming recording marks; and a second area in which medium identification information for specifying a type of the medium is recorded by use of pre-pits that are formed by concave portions and/or protrusions, a shortest pre-pit length in the pre-pits which form the medium identification information is longer than a shortest recording mark length in the recording marks in the first area.

According to the arrangement, in a recordable/reproducible super-resolution optical information recording medium according to the present invention, a shortest pre-pit length in the pre-pits in which the medium identification information is recorded is longer than a shortest recording mark length in the recording marks in the first area. Therefore, in a case where the medium identification information is reproduced by a reproduction device having an optical system of which its resolution limit is not longer than or around a length of the shortest recording mark length in the recording marks in the first area, it is possible to reproduce the medium identification information with reproduction laser power optimum for the regular optical information recording medium. Thus, it is possible to realize a super-resolution optical information recording medium capable of identifying the optical information recording medium as a super-resolution optical information recording medium by use of reproduction laser power optimum for a regular optical information recording medium.

In order to attain the object, a super-resolution optical information recording medium according to the present invention includes: a first area in which a content is recorded by use of pre-pits that are formed by concave portions and/or protrusions and one or more of which are shorter than a length of a resolution limit of an optical system in a reproducing device; and a second area in which medium identification information for specifying a type of the medium is recorded by use of pre-pits that are formed by concave portions and/or protrusions, the pre-pits which form the medium identification information being not shorter than the resolution limit of the optical system.

According to the arrangement, the medium identification information of a super-resolution optical information recording medium only for reproduction according to the present invention is recorded by use of pre-pits that are formed by concave portions and/or protrusions and that are not shorter than the resolution limit of the optical system. Therefore, it is possible to reproduce the medium identification information by use of reproduction laser power optimum for a regular optical information recording medium. Thus, it is possible to realize a super-resolution optical information recording medium capable of identifying the optical information recording medium as a super-resolution optical information recording medium by use of a reproduction laser power optimum for a regular optical information recording medium.

In order to attain the object, a super-resolution optical information recording medium according to the present invention includes: a first area in which a content is recorded by use of pre-pits that are formed by concave portions and/or protrusions; and a second area in which medium identification information for specifying a type of the medium is recorded by use of pre-pits that are formed by concave portions and/or protrusions, a shortest pre-pit length in the pre-pits which form the medium identification information is longer than a shortest pre-pit length in the pre-pits in the first area.

According to the arrangement, a shortest pre-pit length in the pre-pits in which the medium identification information is recorded, in a super-resolution optical information recording medium only for reproduction according to the present invention, is longer than a shortest recording mark length in the recording marks in the first area. Therefore, in a case where the medium identification information is reproduced by a reproduction device having an optical system of which its resolution limit is not longer than or around a length of the shortest recording mark length in the recording marks in the first area, it is possible to reproduce the medium identification information with reproduction laser power optimum for the regular optical information recording medium. Thus, it is possible to realize a super-resolution optical information recording medium capable of identifying the optical information recording medium as a super-resolution optical information recording medium by use of a reproduction laser power optimum for a regular optical information recording medium.

An optical information recording medium reproducing device according to the present invention is capable of reproducing (i) the super-resolution optical information recording medium, and (ii) a regular optical information recording medium which is an optical information recording medium in which recording marks or pre-pits are not shorter than the resolution limit of the optical system, the optical information recording medium reproducing device including: reproduction means for reproducing information recorded in a desired position of the optical information recording medium; and control means for controlling operations of the optical information recording medium reproducing device, the control means including: identification information acquisition means for controlling the reproduction means to reproduce and acquire medium identification information by using reproduction light power suitable for reproduction of the regular optical information recording medium; and medium identification means for identifying whether or not the optical information recording medium is a super-resolution optical information recording medium, based on the medium identification information thus acquired.

By having the above arrangement, the reproducing device is capable of identifying whether or not a provided optical information recording medium is the super-resolution optical information recording medium, by use of reproduction light power suitable for the regular optical information recording medium, accurately and with ease. Thus, it is possible to realize a reproducing device capable of reproducing both the super-resolution optical information recording medium and the regular optical information recording medium. Since the identification is carried out by use of reproduction light power suitable for the regular optical information recording medium, electricity consumption of the reproduction device is reduced. Furthermore, no breakage of the regular optical information recording medium occur due to reproduction light power optimum for the super-resolution optical information recording medium, since the identification is carried out by use of reproduction light power suitable for the regular optical information recording medium.

BRIEF DESCRIPTION OF DRAWINGS

FIG. 7(a) is an explanatory drawing illustrating a relationship between a pre-pit and an output signal when a regular medium is reproduced by use of a reproduction clock suitable for a regular medium.

FIG. 7(b) is an explanatory drawing illustrating relationship between a pre-pit and an output signal when a regular medium is reproduced by use of a reproduction clock suitable for a super-resolution medium.

BEST MODE FOR CARRYING OUT THE INVENTION

Embodiment 1

One embodiment of the present invention is described below with reference to FIGS. 1 through 3. The present embodiment is described by having a super-resolution optical information recording medium only for reproduction of which its cross sectional arrangement is of a BD type (hereafter referred to as a super-resolution medium 1) discussed as an example. In the following description, a reproducing device 10 denotes an optical information recording medium reproducing device 10 later described, capable of reproducing both the super-resolution medium 1 according to the present embodiment and a regular optical information recording medium.

Figure 1:
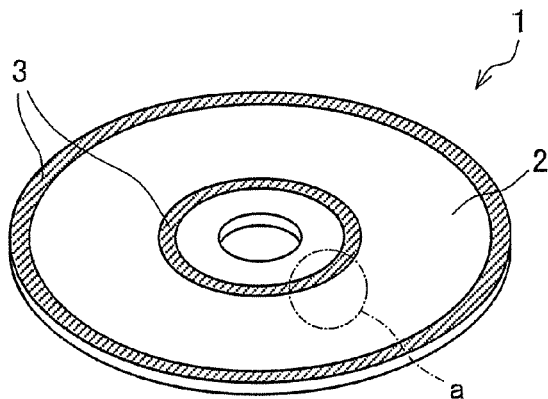
FIG. 1 illustrates one embodiment of the present invention, and is a perspective view illustrating an outer appearance of a super-resolution medium.

FIG. 1 illustrates an outer appearance of the super-resolution medium 1 according to the present embodiment.

Figure 2:
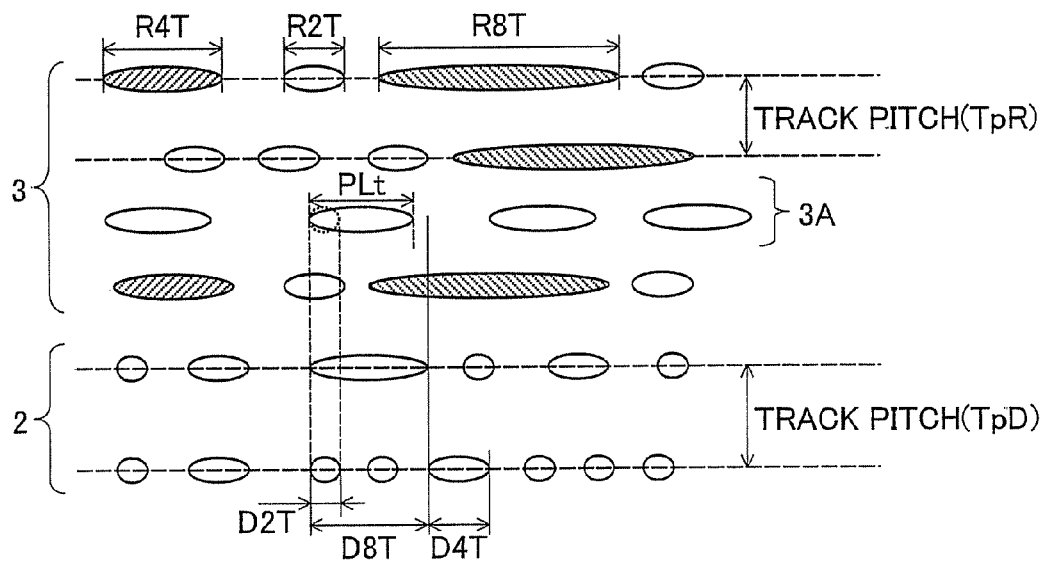
FIG. 2 is a plan view schematically illustrating an essential arrangement of a substrate of the super-resolution medium.

FIG. 2 illustrates an enlarged view of section a in the super-resolution medium 1. A pre-pit having a length R2T shown in FIG. 2 is a shortest pre-pit in (i) a test read area 3A later described and (ii) a medium information area (second area) 3 excluding area position information. A pre-pit having a length R8T is a longest pre-pit in the medium information area 3. Similarly, a pre-pit having a length D2T is a shortest pre-pit in a data area (first area) 2, and a pre-pit having a length D8T is a longest pre-pit in the medium information area 3, as shown in FIG. 2.

As shown in FIG. 1, the super-resolution medium 1 has the data area 2 and the medium information area 3 in advance. A content such as video image and software is recorded in the data area 2, and information concerning the super-resolution medium 1 is recorded in the medium information area 3.

Figure 3:
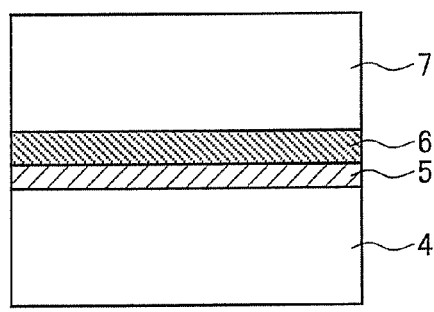
FIG. 3 is a cross sectional view schematically illustrating an arrangement of the super-resolution medium.

FIG. 3 illustrates a cross sectional view of the super-resolution medium 1. The super-resolution medium 1 includes a substrate 4, and (i) a reflection layer 5 and (ii) a super-resolution reproduction layer 6 which causes a super-resolution phenomenon to occur are layered on the substrate 4 in this order by sputtering. Furthermore, a transparent cover layer 7 is provided on the super-resolution reproduction layer 6. The substrate 4 and the cover layer 7 are made of polycarbonate. The reflection layer 5 is made of aluminum. Furthermore, the super-resolution reproduction layer 6 is made of zinc oxide.

The data area 2 is provided between the medium information areas 3, as illustrated in FIG. 1. The content is recorded by providing pre-pits that are formed by concave portions and/or protrusions on the substrate when the substrate is formed. The pre-pits are pre-pits in a length in a range of lengths D2T to D8T as illustrated in FIG. 2, and their shortest length is shorter than a resolution limit of an optical system in the reproducing device 10. More specifically, the content is recorded by use of the pre-pits including a pre-pit shorter in length than the resolution limit of the optical system in the reproducing device 10 (super-resolution recording form). Thus, recording with a density higher than the regular medium is possible. The data area 2 is (1, 7) RLL modulated, however it is not limited to this, and may be of any form provided that recording is carried out by use of a random pattern.

Information is recorded by use of the pre-pits or recording marks with different lengths such as the (1, 7) RLL modulation, since recording density increases as compared to recording information by use of pre-pits or recording marks of a same length. Other modulation types are also possible (for example, 8/16 modulation, (2, 7) RLL modulation), and are referred to as recording by use of a random pattern.

Furthermore, as illustrated in FIG. 3, the pre-pit is reproducible by having the super-resolution reproduction layer 6. More specifically, a laser spot is generated by irradiation of reproduction laser light to the pre-pit. Due to a temperature distribution generated by a light intensity distribution in the laser spot on the super-resolution reproduction layer 6, a distribution of a transmittance is generated. As a result, the laser spot is shrunk in a pseudo manner, thereby the pre-pit is made reproducible. This allows more information to be usable as compared to a regular medium. The super-resolution reproduction layer 6 is not particularly limited, provided that the pre-pit is reproducible, and may be, for example, the mask layer as described in Patent Document 2, or the functional layer as described in Patent Document 3.

The medium information area 3 is provided at an innermost circumferential section and an outermost circumferential section of the super-resolution medium 1 in advance, as illustrated in FIG. 1. Information concerning the super-resolution medium 1 is recorded by use of pre-pits that are formed by concave portions and/or protrusions (regular recording form). The pre-pits are pre-pits having a length in a range of lengths R2T to R8T. A shortest length of the pre-pits is longer than a resolution limit of an optical system in the reproducing device 10. In other words, the shortest pre-pit length in a pre-pit group of the medium information area 3 is longer than the shortest pre-pit length in the pre-pit group of the data area 2. The medium information area 3 is provided at the inner circumference and the outer circumference of the super-resolution medium 1, however it is not limited to this, and may be provided on just one of the inner circumference and the outer circumference.

Information concerning the super-resolution medium 1 encompass: medium identification information indicating that the medium includes a data area 2; reproduction speed information to be used when the reproducing device 10 carries out reproduction; medium unique number used for copy protection; and area position information for specifying a position in the data area 2.

The medium identification information is sufficient provided that a type of medium is specified therefrom, and is not particularly limited as long as at least the information indicates whether the data area 2 is in a super-resolution recording form or a regular recording form.

The reproduction speed information encompass (i) so-called reproduction information required in order to obtain an analog waveform which can be digitized, when an appropriate reproduction laser is irradiated, and (ii) digital processing information required in order to digitize an analog waveform reproduced so as to reproduce contents and the like.

The reproduction information includes, for example, reproduction speed range information. The reproduction speed range information is information which specifies reproduction speed in order to stably obtain an analog waveform based on super-resolution reproduction. This is because in a case where the super-resolution reproduction is possible by use of heat, if the reproduction speed is too fast, super-resolution reproduction is impossible because of insufficient heat, whereas if the speed is too slow, the heat energy to be generated is too great, thereby causing damage to the medium.

The digital processing information includes, for example, reproduction clock switching information and reproduction speed switching information. The reproduction clock switching information and the reproduction speed switching information are information required in order to digitize an obtained analog waveform, when random patterns having different recording densities is reproduced. More details are later described.

A test read area 3A is provided in the medium information area 3, as illustrated in FIG. 2. The test read area 3A adjusts reproduction laser power to be used in order for the reproducing device 10 to reproduce the contents recorded in the data area 2. In the test read area 3A, pre-pits that are formed by concave portions and/or protrusions are formed in a same recording density and modulation type as the pre-pits in the data area 2. The test read area 3A may have pre-pits having (i) a length longer than the shortest pre-pit length in the pre-pits in the data area 2 and (ii) a length shorter than the longest pre-pit length in the pre-pits in the data area 2, i.e., a pre-pit longer than D2T but shorter than D8T, as illustrated in FIG. 2. For example, pre-pits having a length as illustrated in FIG. 2 are formed. The pre-pit illustrated with a broken line in the test read area 3A for comparison is the shortest pre-pit in the data area 2.

As described above, the medium information area 3 of the super-resolution medium 1 according to the present embodiment has pre-pits formed that are not shorter than a resolution limit of an optical system in the reproducing device 10. Thus, it is possible for the reproducing device 10 to reproduce various information such as the medium identification information, the reproduction speed information and the medium unique number.

The test read area 3A is preferably provided at a position closer to the data area 2 in the medium information area 3 than the position of the pre-pits in which the medium identification information is recorded. This arrangement enables efficient information recording and/or information reproduction. The following description explains the reasons of this, with reference to examples.

For example, reproduction is carried out as follows in a medium in which (i) a medium information area is provided on an inner circumferential side than the data area on the medium, and (ii) a test read area is provided on an inner circumferential side of pre-pits in which the medium identification information is recorded. Namely, reproduction is carried out as follows in a medium in which the test read area is provided at a position far from the data area than the position of the pre-pits in which the medium identification information is recorded.

First, the reproducing device reproduces the medium identification information in order to identify a type of medium. Then, an optical head is moved to the test read area included on the inner circumferential side of the medium, and a test read is carried out. This determines reproduction laser power and the like. Thereafter, the optical head is moved to the data area on an outer circumferential side of pre-pits in which the medium identification information is recorded, by which the content in the data area is reproduced. As such, the reproducing device requires the optical head to reciprocate in order to start reproduction, if the test read area is provided in the medium information area at a position far from the data area than the pre-pits are in which the medium identification information is recorded. As a result, problems occur that (i) reproduction start-up time is increased, and (ii) breakage rate of the reproducing device caused by complex movement of the optical head is increased.

In comparison, the optical head just requires to move in one direction if the test read area 3A is provided in the medium information area 3 at a position closer to the data area 2 than the pre-pits are in which the medium identification information is recorded, as like the super-resolution medium 1. Thereby, the optical head does not need to make any complex movements. Therefore, it is possible to shorten the reproduction start-up time, and reduce the breakage rate of the reproducing device.

The above description explains a case where the test read area 3A is provided closer to the data area 2 than the pre-pits are in which the medium identification information is recorded, in a radius direction. However, it is not limited to this, and the same applies for a case where the test read area 3A is provided closer to the data area 2 in a direction in which the pre-pits and grooves are arranged (same direction as a direction in which reproduction is carried out). The same also applies for the following description which describes pre-pits provided close to or far from the data area 2.

The pre-pit in which the reproduction speed information is recorded is preferably provided at a position far from the data area 2 than the test read area 3A is. This arrangement allows reproduction of the reproduction speed information by use of reproduction laser power optimum for a regular medium. It is also possible to determine, in the test read area 3A, reproduction laser power for reproducing the content recorded in the data area 2, provided that the reproduction speed information is obtained. Specifically, it is possible to digitize an analog waveform obtained in a reproduction speed at which stable super-resolution reproduction can be attained, in a state adapted to a recording density of the test read area 3A. Therefore, no mistakes occur in determination of the reproduction laser power.

The reproduction speed denotes a linear velocity in reproduction (a relative velocity of an optical head in a reproduction position reproduction direction, caused by rotation of a medium by a spindle motor when the medium is reproduced).

It is possible to appropriately digitize the analog waveform obtained at a reproduction speed at which stable super-resolution reproduction can be attained, even in reproduction of the contents recorded in the data area 2. Therefore, it is possible to stably reproduce the contents.

The pre-pit in which the area position information is recorded is preferably provided at a position closer to the data area 2 than the test read area 3A is. This arrangement allows reproduction of the area position information by use of reproduction laser power optimum for the regular medium. This arrangement also allows, after determination of the reproduction laser power, reproduction of the area position information without making any changes to the determined reproduction laser power. This simplifies the movement taken by the optical head (movement in one direction). Thus, an efficient information recording and/or information reproduction is possible. Furthermore, the medium information area 3 can be made narrow, and the data area 2 be made wide, thereby increasing an information recording capacitance as a result.

The medium unique signal is different for each manufactured medium. Therefore, the medium unique signal cannot not formed by compression molding of a highly productive substrate as like the pre-pits, and is usually created by forming a groove section on the substrate with a laser or the like, at the end of creating the medium.

A wavelength of a significant power laser to be used in order to create the medium unique signal increases in cost if the wavelength is of a short wavelength, as like one used in optical disc reproduction. Therefore, usually, the wavelength is made longer than the one used in the optical disc reproduction (the wavelengths are long, therefore a small groove section obviously cannot be made). In addition, since a groove section is formed by use of the significant power laser, the medium unique signal has damage in the first place. Therefore, there is a high possibility that reproduction by use of a high laser power which readily gives damage may cause reproduction deterioration of the medium unique signal. As such, the reproduction of the medium unique signal is preferably carried out by use of low laser power.

In view of this, the super-resolution medium 1 provides the pre-pit in which the medium unique number is recorded at a position far from the data area 2 than the test read area 3A is. This allows reproduction of the medium unique signal by use of reproduction laser power optimum for a regular medium, that is to say, low laser power. Thereby, it is possible to securely reproduce the medium unique signal. In addition, no wasteful switching of laser power is carried out. Therefore, efficient information recording and/or the information reproduction is/are possible.

Although the present embodiment is described above by discussing the super-resolution medium 1 as an example, which is a medium only for reproduction, the super-resolution optical information recording medium of the present invention obviously includes a recordable/reproducible super-resolution optical information recording medium. A main difference between the recordable/reproducible super-resolution optical information recording medium and the super-resolution medium 1 is, that a test write read area is provided instead of the test read area 3A. In the test write read area, information which adjusts (i) a recording laser power for a reproducing device 10 to be used to record contents in a data area and (ii) a reproduction laser power for the reproducing device 10 to be used to reproduce the contents in the data area are recorded having a same recording density and modulation type as the recording mark group to be formed in the data area.

In the medium information area of the recordable/reproducible super-resolution optical information recording medium, recording condition information for recording contents in the data area is recorded by use of pre-pits that are formed by concave portions and/or protrusions and that are not shorter than a resolution limit of an optical system in the reproducing device 10. The pre-pits that are formed by concave portions and/or protrusions thus recorded with the recording condition information are preferably provided at a position far from the data area than the test write read area is. This arrangement allows determination of reproduction laser power at the test write read area based on the recording condition information, and as a result, a determination mistake of the reproduction laser power does not occur. The recording condition information includes not only the recording laser power, but also removal laser power for forming a recording mark, a pulse width and a timing of a laser, and the like.

Second Embodiment

Figure 4:
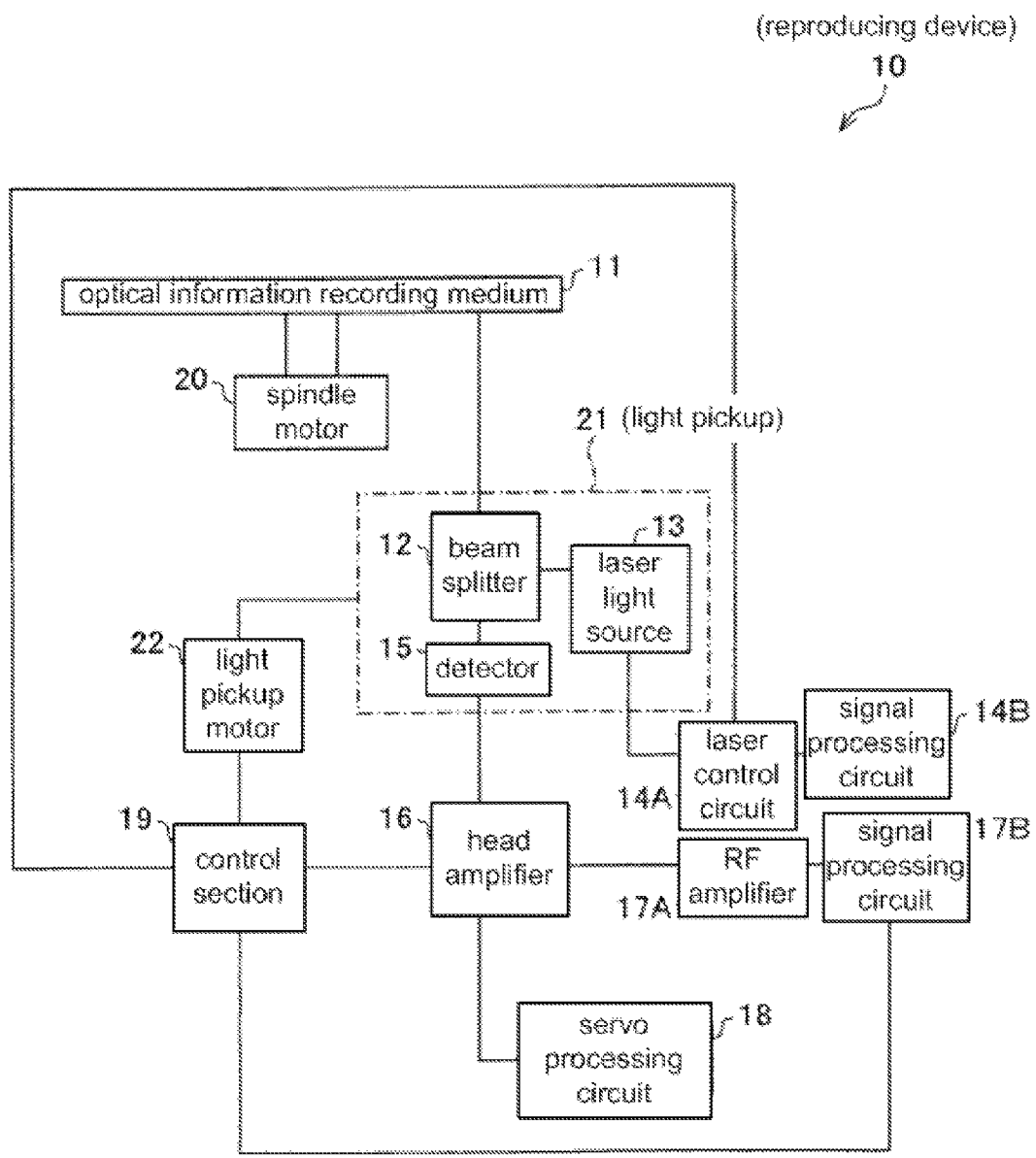
FIG. 4 is a block diagram schematically illustrating an arrangement of an optical information recording medium reproducing device capable of reproducing the super-resolution medium and a regular medium.
Figure 5:
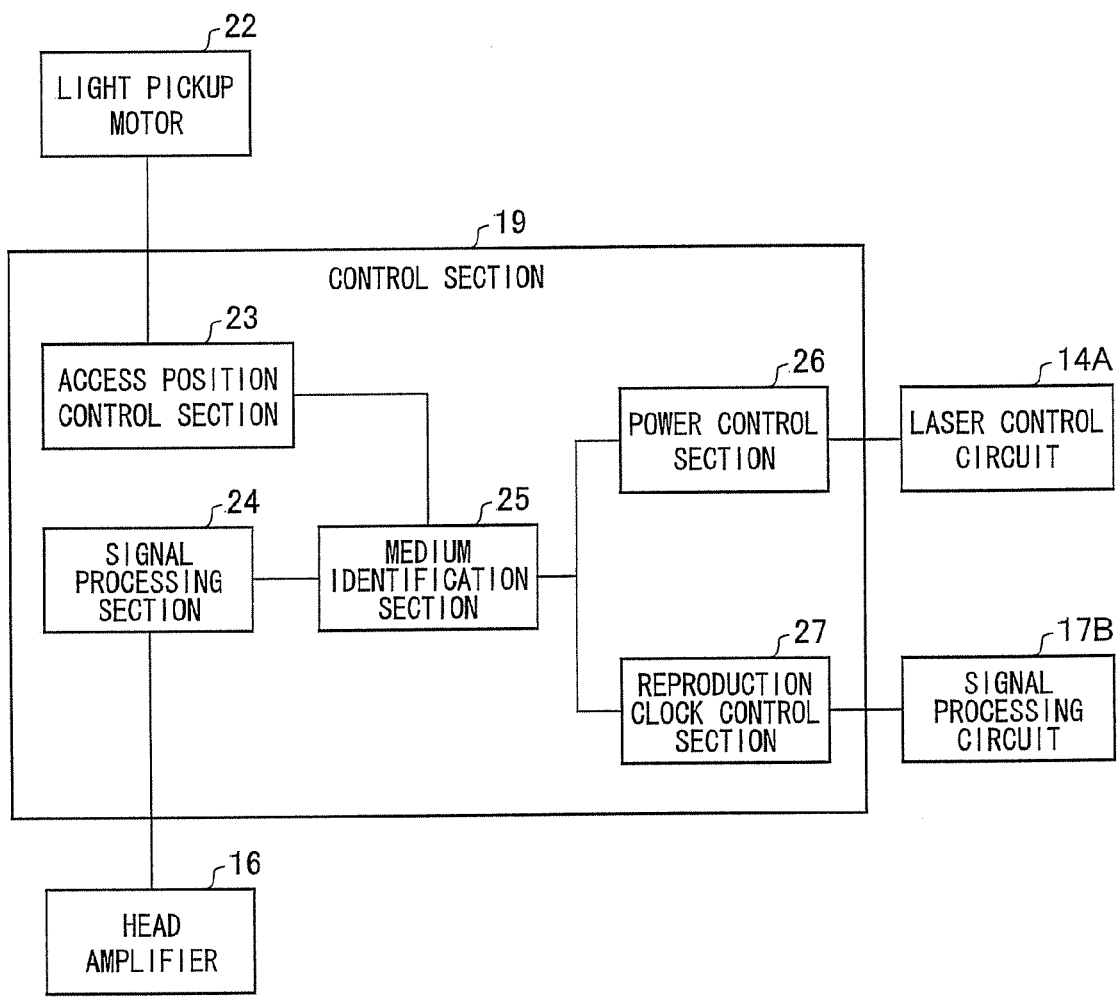
FIG. 5 is a block diagram schematically illustrating an arrangement of a control section of the optical information recording medium reproducing device.
Figure 6:
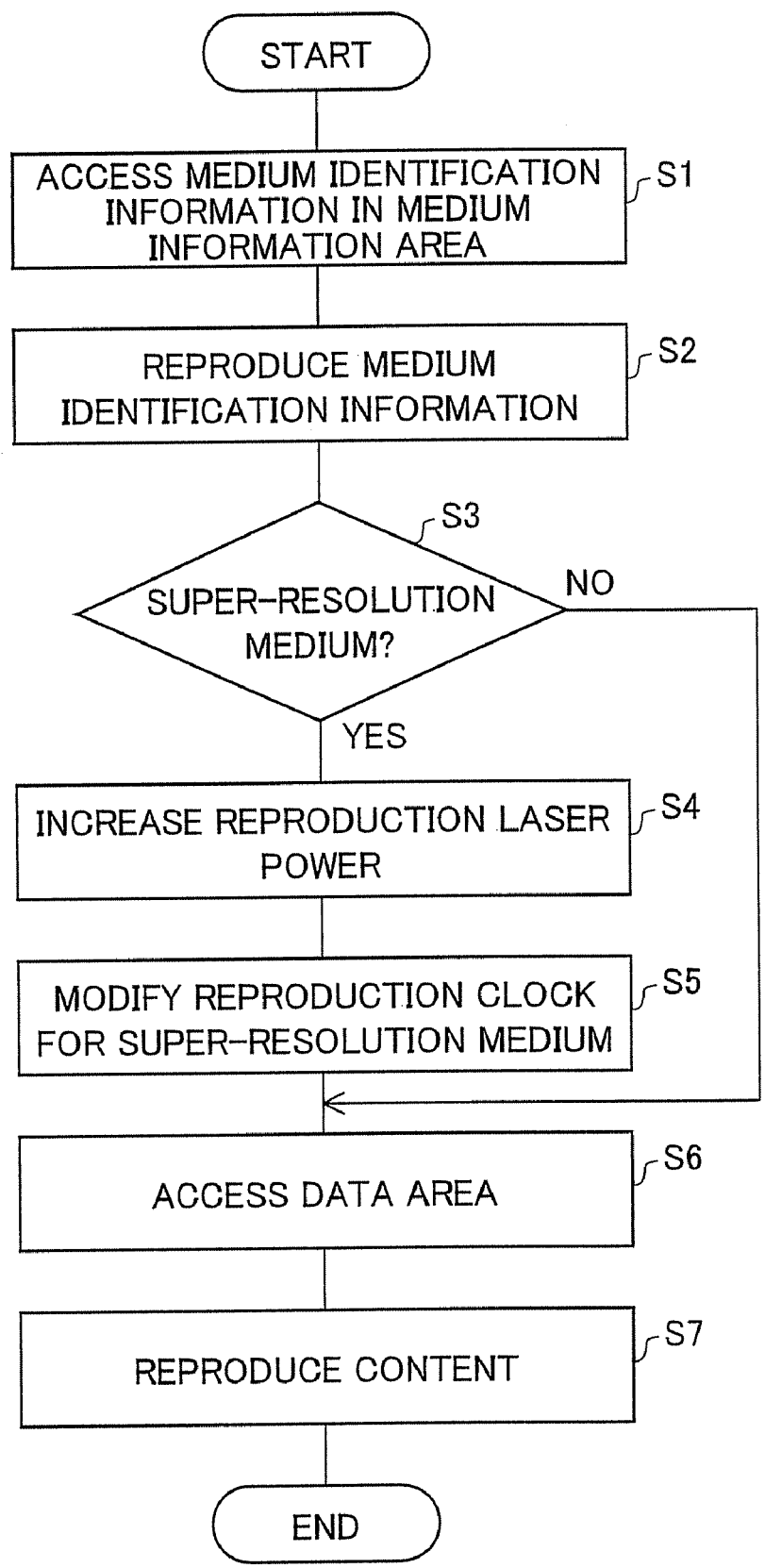
FIG. 6 is a flow chart illustrating a process operation of the optical information recording medium reproducing device.

The following description explains another embodiment of the present invention, with reference to FIGS. 4 through 6. FIG. 4 schematically illustrates an arrangement of a reproducing device 10 according to the present embodiment. The reproducing device 10 of the present embodiment is capable of reproducing both the super-resolution medium 1 of First Embodiment and a regular medium.

The reproducing device 10 includes a laser control circuit 14A, a signal processing circuit 14B, a head amplifier 16, an RF amplifier 17A, a signal processing circuit 17B of an RF signal, a servo processing circuit 18, a control section 19 (control means), a spindle motor 20, a light pickup 21 (reproduction means), and a light pickup motor 22, as illustrated in FIG. 4. The light pickup 21 includes a polarization beam splitter 12, a laser light source 13, and a detector 15. An optical information recording medium 11 shown in FIG. 4 may be the super-resolution medium 1 or may be a regular medium.

The reproducing device 10 first causes the optical information recording medium 11 to rotate by use of the spindle motor 20. The light pickup 21 is moved by controlling the light pickup motor 22 with the control section 19. Next, power of reproduction laser light to be irradiated from a laser light source 13 caused by the laser control circuit 14A is made to be a predetermined reproduction laser power (reproduction laser power for a regular medium). Thereafter, the reproduction laser light is irradiated from the laser light source 13. The reproduction laser light is irradiated to the optical information recording medium 11 via a polarization beam splitter 12. Then, light reflected from the light information recording medium 11 reaches a detector 15 via the polarization beam splitter 12.

The detector 15 outputs an electric signal based on the reflected light thus reached. The electric signal is amplified at the head amplifier 16, thereafter is sent to the servo processing circuit 18. Various servo controls are carried out at the servo processing circuit 18. In addition, the electric signal is also sent to the control section 19.

FIG. 5 illustrates an arrangement of the control section 19. The control section 19 includes an access position control section 23, a signal processing section 24 (identification information acquisition means), a medium identification section 25 (medium identification means), a power control section 26 (power control means), and a reproduction clock control section 27 (reproduction clock control means), as illustrated in FIG. 5.

The access position control section 23 controls the light pickup motor 22 so that the light pickup 21 accesses a desired position of the optical information recording medium 11. In a case a track pitch of a data area 2 and a track pitch of a medium information area 3 are different in the super-resolution medium 1, it is desirable for the access position control section 23 to control an access position based on an identification result of the optical information recording medium 11 identified by the medium identification section 25.

The signal processing section 24 processes a medium identification signal received from the head amplifier 16, and supplies the medium identification signal thus processed to the medium identification section 25. The medium identification section 25 carries out identification of the optical information recording medium 11, based on the medium identification signal supplied from the signal processing section 24.

The power control section 26, based on an identification result of the optical information recording medium 11 determined by the medium identification section 25, either (i) leaves the reproduction laser power of the laser light source 13 as it is (that is to say, as reproduction laser power suitable for a regular medium), or (ii) switches the reproduction laser power to reproduction laser power suitable for the super-resolution medium 1 by controlling the laser control circuit 14A. The reproduction clock control section 27, based on the identification result of the optical information recording medium 11 determined by the medium identification section 25, either (i) leaves the reproduction clock to be used at the signal processing circuit 17B as it is (that is to say, as the reproduction clock suitable for a regular medium), or (ii) switches the reproduction clock to the reproduction clock suitable for a super-resolution medium.

The following description explains a processing operation of the reproducing device 10 with reference to FIG. 6. FIG. 6 illustrates a flow of processing operations in the reproducing device 10.

Once the optical information recording medium 11 is provided in the reproducing device 10, the light pickup motor 22 is controlled by the access position control section 23 in the control section 19, and in response, a reproduction laser light from the laser light source 13 is irradiated to a medium information area, which is an initial access position of the optical information recording medium 11, based on reproduction laser power for a regular medium determined in advance for initial reproduction (S1). Thereafter, medium identification information which indicates whether the light information recording medium 11 is a super-resolution medium or a regular medium, that is to say, a medium identification signal of a medium identification information indicating whether or not a data area of the optical information recording medium 11 is of a super-resolution form, is reproduced (S2). The medium identification signal is processed by the signal processing section 24 in the control section 19, via the detector 15 and the head amplifier 16, by which identification of the light information recording medium 11 is carried out at the medium identification section 25 (S3).

When the identification result determined by the medium identification section 25 indicates a regular medium (NO in S3), a data area of the regular medium is accessed without any modification to the reproduction laser power and the reproduction clock (S6). Thereafter, content in the data area is reproduced via the detector 15, the head amplifier 16, the RF amplifier 17A, and the signal processing circuit 17B (S7).

On the other hand, if the identification result determined by the medium identification section 25 indicates the super-resolution medium 1 (YES in S3), the reproducing device 10 reads out a pre-pit in the test read area 3A provided in the medium information area 3 of the super-resolution medium 1. A reproduction signal which has read the pre-pit is supplied to the power control section 26 in the control section 19, via the detector 15, the head amplifier 16, and the signal processing section 24. The power control section 26 controls the laser control circuit 14A so as to cause the reproduction laser power of the laser light source 13 to increase based on the reproduction signal so that the reproduction laser power is adjusted to be optimum for the super-resolution medium 1 (S4).

Next, the reproduction device 10 reproduces reproduction clock switching information, recorded in the medium information area 3 of the super-resolution medium 1. The reproduction clock switching signal is supplied to the reproduction clock control section 27 in the control section 19, via the detector 15, the head amplifier 16, and the signal processing section 24. The reproduction clock control section 27, based on the reproduction clock switching signal, changes the reproduction clock to a reproduction clock for a super-resolution medium specified in advance (S5). Thereafter, the data area 2 is accessed in reproduction laser power for the super-resolution medium 1 (S6). A content recorded in the data area 2 is then reproduced, via the detector 15, the head amplifier 16, the RF amplifier 17, and the signal processing circuit 17B (S7).

As described above, since the reproducing device 10 includes the super-resolution medium 1 arranged as the aforementioned, it is possible for the reproducing device to carry out identification of whether or not the provided optical information recording medium is the super-resolution medium 1, easily and accurately, by use of low reproduction laser power for a regular medium. The reproducing device 10 is also capable of switching reproduction laser power and a reproduction clock suitable for the provided optical information recording medium, based on the identification result.

Thus, the reproducing device 10 can reproduce both the super-resolution medium 1 and the regular medium. Since the identification can be carried out by use of low reproduction laser power for a regular medium, electricity consumption of the reproducing device 10 is suppressed, and furthermore, breakage of the regular medium is prevented, caused by the reproduction laser power for the super-resolution medium 1.

As described above, in the present embodiment, the reproduction clock switching information is recorded in the super-resolution medium 1, and the reproducing device 10 switches the reproduction clock based on the reproduction clock switching information in order to reproduce super-resolution medium 1. However, the arrangement may be one in which the reproduction clock is switched based on an identification result of the optical information recording medium. In such a case, recording of the reproduction clock switching signal in the super-resolution medium 1 is not necessary.

The following description explains a reason for switching a reproduction clock between the super-resolution medium 1 and the regular medium, by discussing an example in which a regular medium only for reproduction is reproduced by use of (i) a reproduction clock for a regular medium and (ii) a reproduction clock for a super-resolution medium, with reference to FIGS. 7(a) and 7(b). The regular medium is (1, 7) RLL modulated. Namely, pre-pits are provided on a substrate which pre-pits have lengths in a range of a length of a shortest pre-pit 2T to a length of a longest pre-pit 8T, where a length T is a standard channel pit length.

The optical information recording medium reproduces a signal, by (i) irradiating reproduction laser to a pre-pit provided on a substrate, and (ii) binarizing an output signal obtained due to light of the reproduction laser thus reflected, based on whether or not the output signal is greater than a slice level set in the reproducing device.

FIG. 7(a) illustrates a state in which (i) the regular medium is reproduced by use of a reproduction clock for the regular medium, and (ii) a signal thus obtained due to the reproduction of the regular medium is binarized. An output signal corresponds to a respective pre-pit illustrated on a lower side of the drawing. FIG. 7(b) illustrates a state in which (i) the regular medium is reproduced by use of a reproduction clock for the super-resolution medium 1, and (ii) a signal thus obtained due to the reproduction of the regular medium is binarized. An output signal corresponds to a respective pre-pit illustrated on a lower side of the drawing.

The following description explains the case where the regular medium is reproduced by use of the reproduction clock for the regular medium. As illustrated in FIG. 7(a), a 2T pre-pit, a space, and a 4T pre-pit are reproduced. The output signal is binarized at the point the output signal corresponds to the reproduction clock of the regular medium, as illustrated in FIG. 7(a). As a result, the values become "1, 1, 0, 0, 1, 1, 1, 1". The signal of "1, 1" is processed as the 2T pre-pit, and the signal of "1, 1, 1, 1" is processed as the 4T pre-pit. A signal level V1 at the time of binarizing is sufficiently greater than a slice level, as illustrated in FIG. 7(a). Therefore, even if a reasonable change occurs due to individual specificity of the regular medium and the reproducing device, stable reproduction is carried out.

The following description explains a case where the regular medium is reproduced by use of the reproduction clock for the super-regular medium 1. Assume that the super-resolution medium 1 has a linear density twice as more as the regular medium. Therefore, a reproduction clock width for the super-resolution medium 1 is half the width of a reproduction clock width for the regular medium.

When the regular medium is reproduced by use of the reproduction clock for the super-resolution 1, a signal thus binarized becomes "1, 1, 1, 1, 0, 0, 0, 0, 1, 1, 1, 1, 1, 1, 1, 1", as illustrated in FIG. 7(b). As similar to the reproduction of the regular medium, the signal of "1, 1, 1, 1" is processed as a 2T pre-pit, and the signal of "1, 1, 1, 1, 1, 1, 1, 1" is processed as a 4T pre-pit.

Thus, it is possible to reproduce the regular medium by use of the reproduction clock for the super-resolution medium 1. However, a signal level V2 is insufficiently increased in response to the slice level at the timing in which the value is binarized, as illustrated in FIG. 7(b). This causes a higher possibility of reproduction malfunction occurrence due to changes caused by individual difference of the regular medium and the reproducing device. That is to say, if the reproduction is not carried out with a reproduction clock suitable for the optical information recording medium, the reliability of the reproduction decreases.

For example, it is also possible to show in a pseudo manner that the regular medium is reproduced by use of a reproduction clock for the regular medium, by (i) reproducing the regular medium by use of a reproduction clock for a super-regular medium 1, (ii) sliding a timing of binarizing an output signal, and (iii) the output signal thus binarized is read in by alternately skipping one value. However, such signal processing causes a problem that the process becomes extremely complex. Therefore, in order to reproduce the regular medium and the super-resolution medium 1 in an optimistic state for each medium, it is required to modify the reproduction clock for each case. Therefore, the reproducing device 10 switches the reproduction clock between the super-resolution medium 1 and the regular medium.

The reproduction clock switching information is recorded by use of a pre-pit having a length longer than the resolution limit of the optical system in the reproducing device 10. Therefore, reproduction by use of the reproduction laser power and the reproduction clock for the regular medium is possible. As a result, wasteful switching of the reproduction laser power and the reproduction clock is unnecessary.

As described above, the reproducing device 10 switches the reproduction clock between the regular medium and the super-resolution medium 1. However, in such case, circuit load increases, for example a number of standard oscillators provided is increased to two, or the like. In view of this, instead of switching the reproduction clock, a reproduction speed may be varied.

For example, with a super-resolution medium 1 which has twice a linear density of a regular medium, a transmission speed of a signal to be reproduced is also slowed down to half the speed when a reproduction speed is varied and slows down to half the speed. Therefore, problems such as the decrease in reproduction reliability is prevented, even if the reproduction clock is not switched. Therefore, the reproducing device 10 may be arranged so that the reproduction speed is varied instead of switching the reproduction clock. In such case, the reproduction speed may be varied based on the reproduction speed switching information recorded in the medium information area 3 of the super-resolution medium 1. The reproducing speed may also be varied based on the identification result of the optical information recording medium.

In this case, recording of the reproducing speed switching information in the super-resolution medium 1 is not necessary.

With the arrangement in which the reproduction speed is varied, although the circuit load is reduced as compared to the arrangement in which the reproducing clock is switched, the transmission speed of the super-resolution medium 1 becomes the same as the transmission speed of the regular medium. On the other hand, with the arrangement in which the reproduction clock is switched, the transmission speed of the information of the super-resolution medium 1 can be made faster.

The reproducing device 10 determines an optimum reproduction laser power by increasing reproduction laser power to be irradiated to the test read area 3A of the super-resolution medium 1, until a reproduction error is minimized, as similar to a method for determining a recording laser power in a typical recording and reproducing device.

However, it is also possible to determine the optimum reproduction laser power by: (i) forming a test read area 3A in the super-resolution medium 1 by use of pre-pits that are longer than a shortest pre-pit in the pre-pits of the data area 2 but shorter than a longest pre-pit in the pre-pits of the data area 2, and (ii) increasing the reproduction laser power until an amplitude of a reproduction signal of the pre-pits in the test read area 3A is maximized, as described in First Embodiment. The following description explains this with reference to FIG. 8.

Generally, information is recorded in a data area of a super-resolution medium by use of combinations of pre-pits and the like of various lengths. Therefore, when the pre-pits of various lengths are reproduced in a same reproduction laser power, a C/N (carrier to noise ratio) with respect to the pre-pits of each length differs, therefore a minimum C/N value is provided. The minimum value changes according to the reproduction laser power, therefore the reproduction laser power which causes the pre-pits in various lengths to have the maximum C/N minimum values can be considered as the optimum reproduction laser power.

Figure 8:
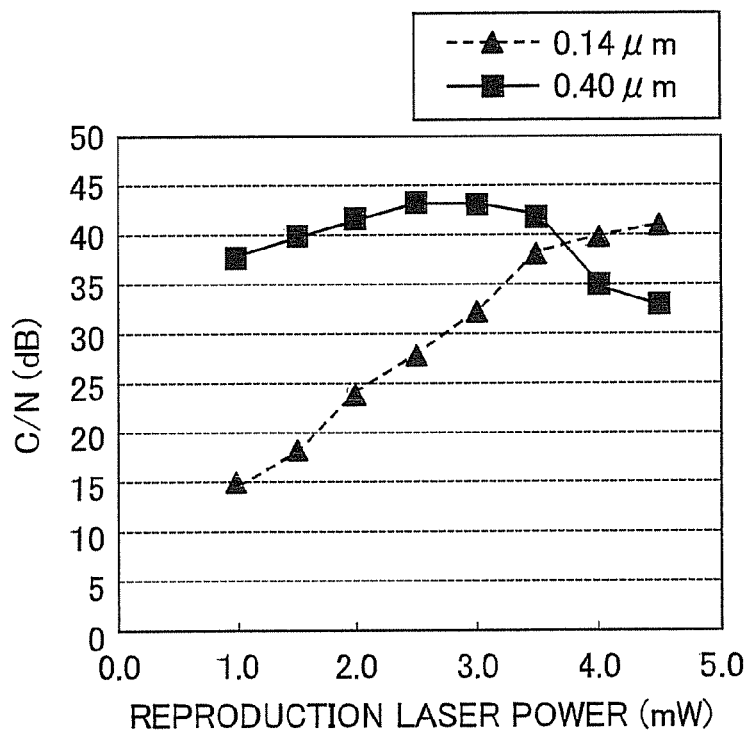
FIG. 8 is a graph illustrating dependency of C/N on reproduction laser power, for a shortest pre-pit and a longest pre-pit.

FIG. 8 illustrates the C/N with respect to pre-pits when reproduction laser power to be irradiated to a shortest pre-pit and a longest pre-pit in the super-resolution medium 1 is changed in a range of 1 mW to 5 mW. The shortest pre-pit has a length of 0.14 μm, and the longest pre-pit has a length of 0.40 μm. The graph in FIG. 8 illustrates the C/N in the vertical axis, and the reproduction laser power in the horizontal axis.

As illustrated in FIG. 8, with the shortest pre-pit, the C/N monotonously increases as the reproduction laser power is increased. On the other hand, with the longest pre-pit, the C/N increases until the reproduction laser power reaches approximately 2.5 mW, however the C/N starts to decrease when the reproduction laser power exceeds approximately 3.0 mW. With reference to FIG. 8, it is assumable that a graph of the C/N with respect to pre-pits of various lengths is positioned between the graph of the C/N with respect to the shortest pre-pit and the graph of the C/N with respect to the longest pre-pit.

It is considered from the above that a reproduction laser power in the vicinity of a point where (i) the graph of the C/N with respect to the shortest pre-pit and (ii) the graph of the C/N with respect to the longest pre-pit intersect with each other is the optimum laser power in which the minimum value of the C/N with respect to the pre-pit of various lengths is maximized. Furthermore, it can be expected that a pre-pit exists which has a length in which (i) the C/N with respect to the pre-pit increases until the vicinity of the point thus intersecting is reached and (ii) the C/N with respect to the pre-pit starts to decrease once the vicinity of the intersection point is exceeded.

In the present embodiment, the pre-pits as like the aforementioned are formed as the test read area 3A, in order to adjust the reproduction laser power. Thus, it is possible for the reproducing device 10 to determine an optimum reproduction laser power in reproduction of the super-resolution medium 1, by increasing the reproduction laser power until an amplitude of the reproduction signal of the pre-pit is maximized. Of which pre-pit of which length the reproduction laser power corresponds to is dependent on a thin film layer including a super-resolution reproduction film 4 and a reflection layer 5.

As described above, an amplitude of a reproduction signal is used in order to determine an optimum reproduction laser power, therefore it is not necessary to carry out a determination process for reproduction errors. As a result, an optimum reproduction laser power is quickly determined. In addition, the test read area 3A is provided in the medium information area 3, therefore it is possible to quickly adjust the reproduction laser power of the data area 2.

The test read area 3A is not limited to the above pre-pits. For example, the shortest pre-pit and the longest pre-pit may be formed as the test read area 3A. In such case, the reproducing device 10 can determine the optimum reproduction laser power in reproduction of the super-resolution medium 1, by increasing the reproduction laser power until the amplitudes of the reproduction signals for each of the shortest and longest pre-pit match each other.

The reproducing device 10 may also determine the optimum reproduction laser power in the following method: (i) a C/N slightly lower than the point thus intersecting is set as a C/N threshold value, and a signal amplitude corresponding to the C/N threshold value is set as an amplitude threshold value, and (ii) the reproduction laser power is increased by the reproducing device until the amplitude is not less than the amplitude threshold value. A C/N obtained from a pre-pit made from a same master disc is substantially the same between the optical information recording mediums, provided that the thin film layer which includes the super-resolution reproduction layer 4 and the reflection layer 5 is the same. Therefore, it is possible to use the amplitude threshold value as it is for a same master disc.

The reproduction laser power determination method usable in the present invention is not limited to the above method. For example, the reproduction laser power may be (i) recorded in the medium information area 3 in advance, or (ii) substantially determined or determined based on the medium identification information itself. In the former case where the reproduction laser power is recorded in the medium information area 3 in advance, a combined use of (i) the medium identification information, and (ii) the method determining an optimum reproduction laser power by increasing the reproduction laser power to be irradiated to the test read area 3A until a reproduction error is minimized, enables accurate determination of the reproduction laser power. As a result, determination of the reproduction laser power is quickened, thereby a start-up time of the reproducing device quickens. On the other hand, in the latter case where the reproduction laser power is substantially determined or determined based on the medium identification information itself, as long as the clock switching information or linear velocity modification information is concurrently included in a medium identification number, other information required for reproduction may be recorded as similar to the data area 2. In such case, capacity of the data area 2 is secured even more, thereby allowing an increase in recording capacitance of the medium.

The following description explains a track pitch of the data area 2 (TpD shown in FIG. 2) and a track pitch of the medium information area 3 (TpR shown in FIG. 2). The track pitch TpD of the data area 2 is desirably the same as or narrower than the track pitch TpR of the medium information area 3. FIG. 2 illustrates a case where the track pitch TpD of the data area 2 is narrower than the track pitch TpR of the medium information area 3.

If the track pitch TpD of the data area 2 and the track pitch TpR of the medium information area 3 are the same, although it is not possible to increase the number of tracks in the data area 2, it is possible to increase density of recorded information without providing a mechanism to change the track pitch in the reproducing device 10.

On the other hand, if the track pitch TpD of the data area 2 is narrower than the track pitch TpR of the medium information area 3, it is possible to increase the number of tracks in the data area 2, thereby allowing further increase in density of recorded information. However, it is necessary to provide in the reproducing device a mechanism for changing the track pitch. A laser spot is shrunken in a pseudo manner by use of the super-resolution reproduction layer 6, even in this case. Therefore, no deterioration in cross talk characteristic nor unstableness in tracking occur.

The following description explains the super-resolution reproduction layer 6 illustrated in FIG. 3. The super-resolution reproduction layer 6 desirably is a metal oxide film, particularly a metal oxide film made from metal oxides such as zinc oxide, cerium oxide, or titanium oxide, or is an inorganic film whose main component is the zinc oxide, cerium oxide, or titanium oxide. Such super-resolution reproduction layer 6 attains excellent super-resolution characteristics and sufficient reproduction durability. The following description explains a reason why the effect is attained, with reference to FIG. 9.

Figure 9:
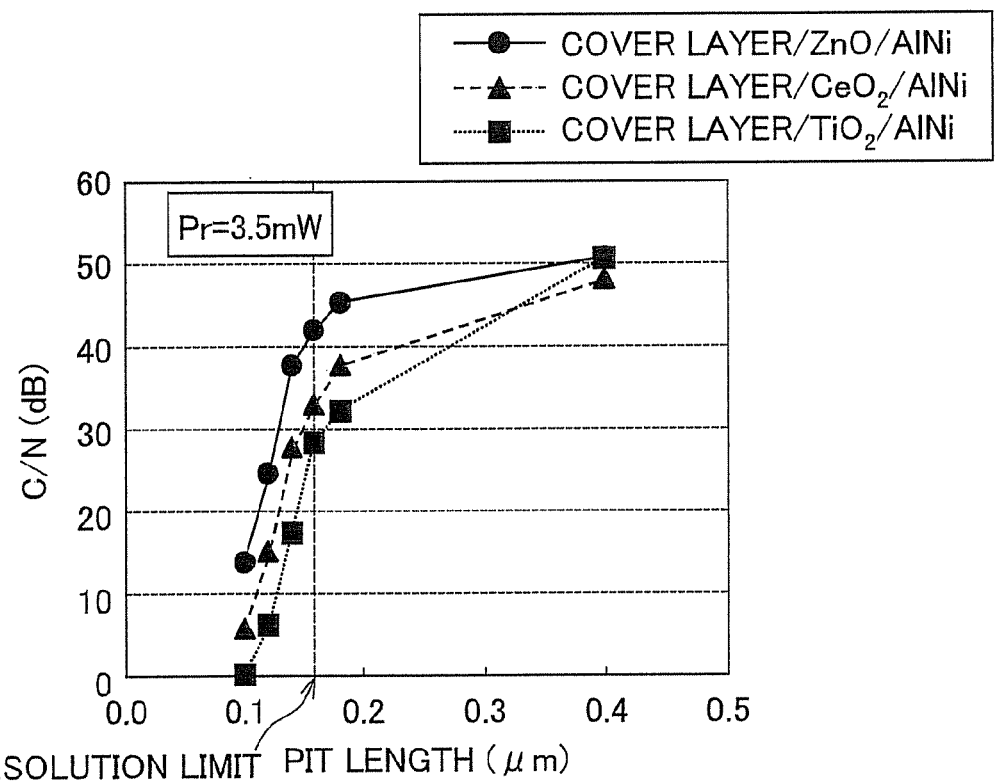
FIG. 9 is a graph illustrating dependency of C/N on a pit length, for each material of a super-resolution reproduction layer.

FIG. 9 illustrates a spatial resolution of the super-resolution medium 1, when a metal oxide film is used as the super-resolution reproduction layer 6. The metal oxide film is formed by applying approximately 120 nm of zinc oxide, cerium oxide or titanium oxide by sputtering. The arrangement of the super-resolution medium 1 which includes the metal oxide film as the super-resolution reproduction layer 6 is as similar to that of FIG. 3, arranged such that a reflection layer 5 and a super-resolution reproduction layer 6 (the metal oxide film), and also a cover layer 7 are provided on a substrate 4. The substrate 4 and the cover layer 7 are made of polycarbonate, and the reflection layer 5 is made of aluminum nickel film having a thickness of 50 nm. Reproduction of the super-resolution medium 1 is carried out by an evaluation machine including an optical system which has a reproduction laser wavelength of 408 nm and a numerical aperture NA of 0.65. A reproduction laser power Pr is set as 3.5 mW. A reproduction laser power for a regular medium is usually around 1.0 mW.

As clearly shown in FIG. 9, the C/N is detected for all three types of metal oxide films, even for the pre-pits that are shorter than the resolution limit of the optical system in the evaluation machine. That is to say, it is obvious that the three types of metal oxide films are usable as the super-resolution reproduction layer. Super-resolution characteristics of the three types of metal oxide films improve in order of titanium oxide, cerium oxide and zinc oxide. Particularly, the zinc oxide and the cerium oxide show better super-resolution characteristics than the titanium oxide.

Furthermore, the metal oxide film excels in durability against temperature change due to heat, as compared to organic materials. Therefore, the metal oxide film excels in reproduction durability as compared to a super-resolution reproduction layer made of organic material disclosed in Patent Document 2. A result of a reproduction durability test carried out for the super-resolution medium 1 which uses zinc oxide as the super-resolution reproduction layer 6 showed no deterioration, as assumed. Specifically, it is possible to realize a super-resolution medium 1 which excels in super-resolution characteristic and reproduction durability as compared to a conventional super-resolution medium, by use of the zinc oxide film as the super-resolution reproduction layer 6.

Figure 10:
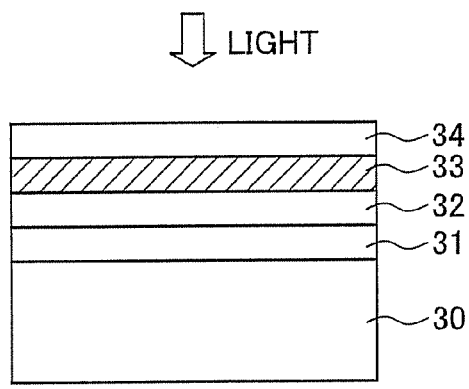
FIG. 10(a) is an explanatory drawing illustrating a cross sectional arrangement of a rewritable BD type medium.
FIG. 10(b) is an explanatory drawing illustrating a cross sectional arrangement of a rewritable DVD type medium.
Figure 10:
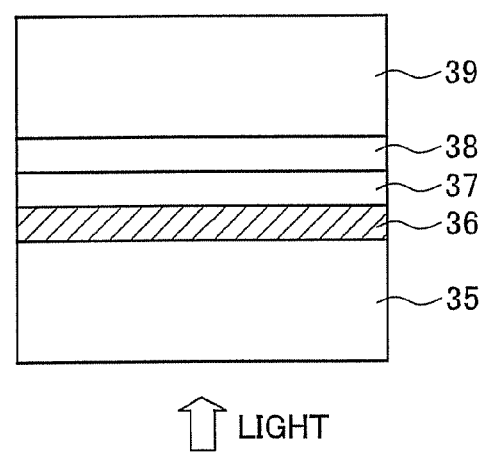
Figure 11:
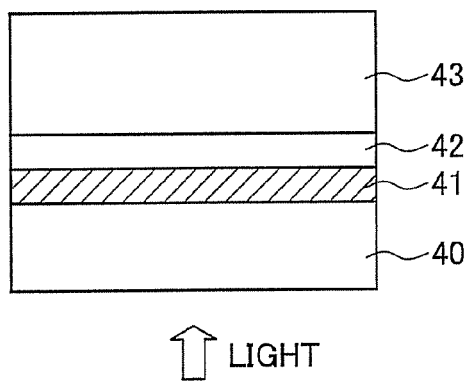
FIG. 11 is an explanatory drawing illustrating a cross sectional arrangement of a DVD type medium only for reproduction.
Figure 12:
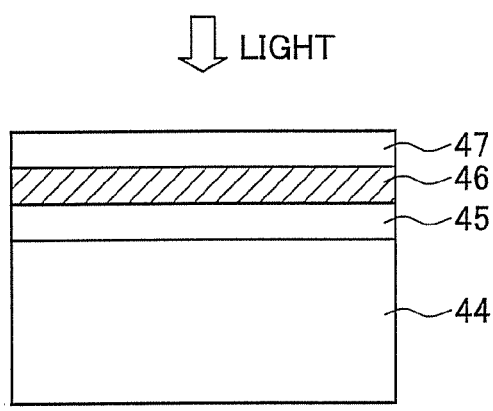
FIG. 12(a) is an explanatory drawing illustrating a cross sectional arrangement of a medium only for reproduction, having a different arrangement to the arrangement shown in FIG. 3.
FIG. 12(b) is an explanatory drawing illustrating a cross sectional arrangement of a medium only for reproduction, having a different arrangement to the arrangement shown in FIG. 11.
Figure 12:
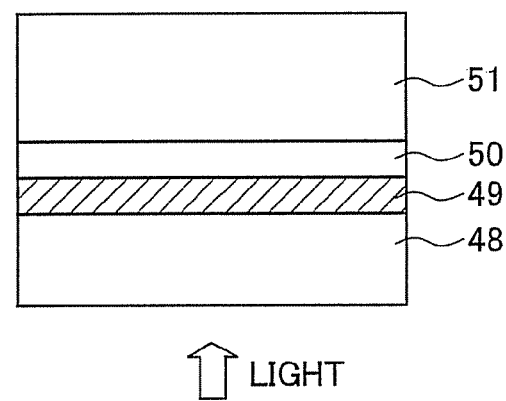

The Embodiment above is explained by discussing the super-resolution medium 1 only for reproduction whose cross sectional structure is of the BD type as an example, however the present invention is not limited to this, and is applicable to various optical information recording mediums as illustrated in FIGS. 10 through 12.

FIGS. 10(a) and 10(b) illustrate a rewritable medium; FIG. 10(a) illustrates a BD type cross sectional structure, and FIG. 10(b) illustrates a DVD type cross sectional structure. FIG. 11 illustrates a medium only for reproduction having a DVD type cross sectional structure. FIGS. 12(a) and 12(b) illustrate a medium only for reproduction; FIG. 12(a) illustrates a cross sectional structure in which the reflection layer 5 as illustrated in FIG. 3 is a light absorbing layer which absorbs reproduction laser and converts the reproduction laser to heat, and FIG. 10(b) illustrates a cross sectional structure in which the reflection layer illustrated in FIG. 11 is a light absorbing layer.

The rewritable medium whose cross sectional structure is of a BD type, as illustrated in FIG. 10(a), is arranged so that a reflection layer 31, a recording layer 32, and a super-resolution reproduction layer 33 are layered on a substrate 30 in this order, and is further provided with a cover layer 34. The rewritable medium whose cross sectional structure is of a DVD type, as illustrated in FIG. 10(b), is arranged so that a super-resolution reproduction layer 36, a recording layer 37, and a reflection layer 38 are layered on a transparent substrate 35 in this order, and is further provided with a cover layer 39. The medium only for reproduction whose cross sectional structure is of a DVD type, as illustrated in FIG. 11, is arranged so that a super-resolution reproduction layer 41 and a reflection layer 42 are layered on a transparent substrate 40 in this order, and is further provided with a cover layer 43.

The medium only for reproduction whose cross sectional structure is of a BD type, as illustrated in FIG. 12(a), is arranged so that a light absorbing layer 45 and a super-resolution reproduction layer 46 are layered on a substrate 44 in this order, and is further provided with a cover layer 47. The medium only for reproduction whose cross sectional structure is of a DVD type, as illustrated in FIG. 12(b), is arranged so that a super-resolution reproduction layer 49 and a light absorbing layer 50 are layered on a transparent substrate 48 in this order, and is further provided with a cover layer 51.

Generally, when reproduction of (i) a super-resolution medium having a super-resolution reproduction layer made of a metal oxide film or (ii) a super-resolution medium using a super-resolution reproduction layer described in Patent Document 2 is to be carried out, a temperature in a laser spot generated due to the reproduction laser is required to be increased to at least a predetermined temperature. As illustrated in FIGS. 12(a) and 12(b), the temperature in the laser spot is easily increased in an arrangement which includes the light absorbing layer 45 or 50, thereby sensitivity is improved.

As a result, the reproduction laser power can be set low, thereby allowing reduction of electricity consumption of the reproducing device. A super-resolution medium which uses the super-resolution reproduction layer made of zinc oxide particularly showed improvement in sensitivity. In addition, reproduction durability further improves, because of a decrease in requirement of the super-resolution reproduction layer to absorb the reproduction laser and generate heat by the super-resolution reproduction layer itself. Specific materials used for the light absorbing layers 45 and 50 encompass Si, Ge, or an alloy whose main component is Si and/or Ge, however the material used for the light absorbing layer is not limited to this.

Figure 13:
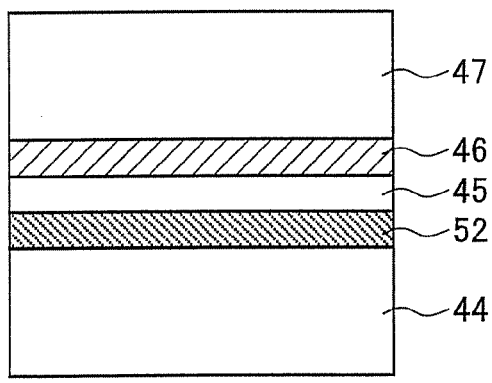
FIG. 13 is an explanation drawing illustrating a cross sectional arrangement of a BD type medium only for reproduction in a case where a heat radiation layer is provided in the medium only for reproduction having a cross sectional arrangement of a BD type as shown in FIG. 12(a).
Figure 14:
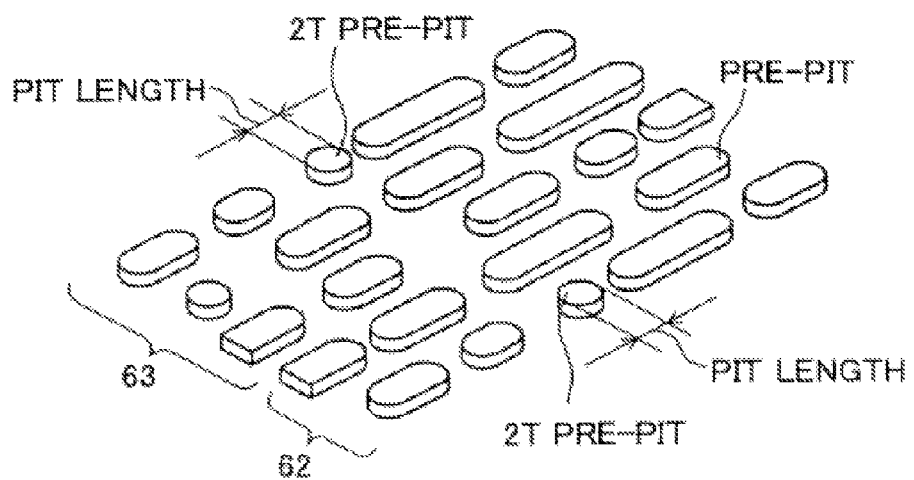
FIG. 14 is a perspective view illustrating an essential arrangement of a substrate in a regular medium.
Figure 15:
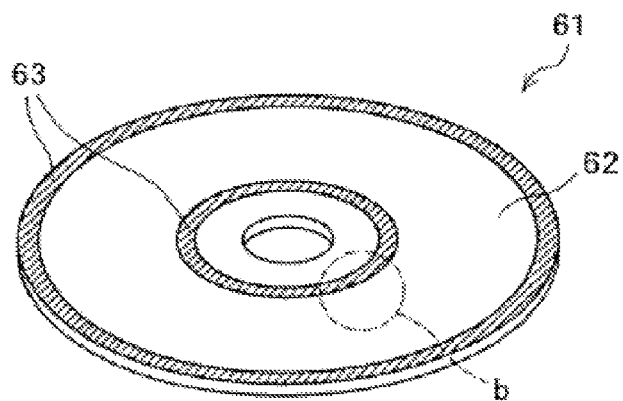
FIG. 15 is a perspective view illustrating an outer appearance of the regular medium.
Figure 16:
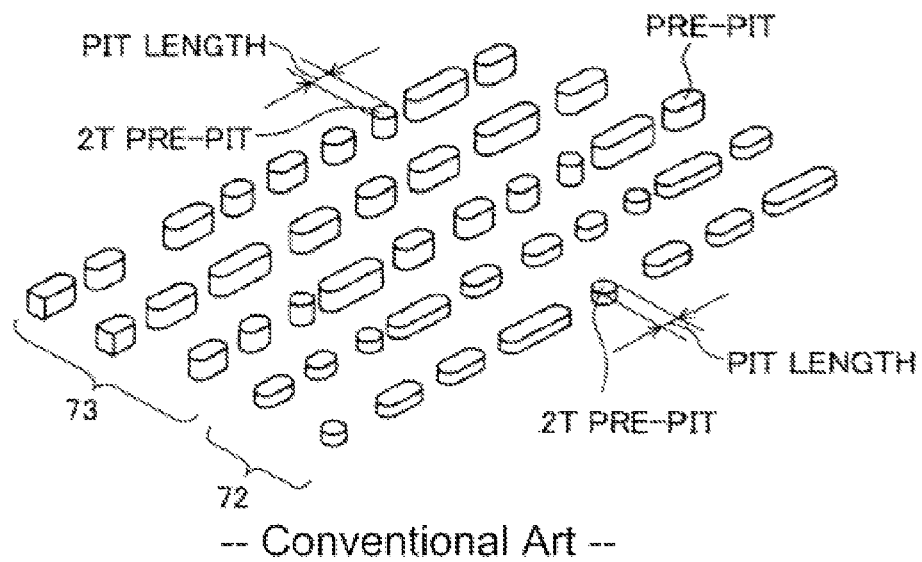
FIG. 16 is a perspective view illustrating an essential arrangement of a substrate in a generally conceivable super-resolution medium.
Figure 17:
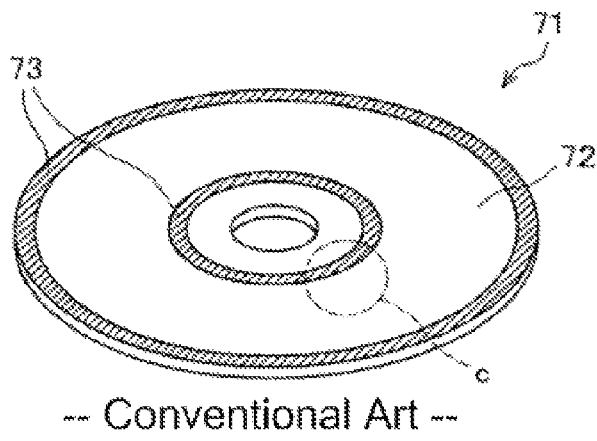
FIG. 17 is a perspective view illustrating an outer appearance of the super-resolution medium.
Figure 18:
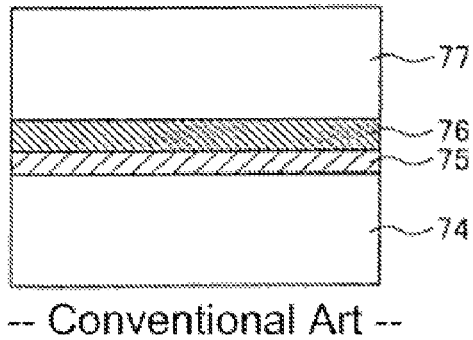
FIG. 18 is a cross sectional view schematically illustrating the super-resolution medium.

A heat releasing layer which releases heat generated due to irradiation of the reproduction laser may be provided in the super-resolution medium 1 and the various optical information recording mediums illustrated in FIGS. 10 through 12. FIG. 13 illustrates a cross sectional structure where a heat releasing layer 52 is provided in a medium only for reproduction as illustrated in FIG. 12(a), whose cross sectional structure is of a BD type. Excess accumulation of heat generated due to irradiation of the reproduction laser is prevented by providing the heat releasing layer 52. Therefore, reproduction durability is improved, thereby signal reproduction of a further high reliability is carried out. Signal reproduction having a further high reproduction durability and reliability is possible, by forming the heat releasing layer 52 by use of a highly heat-conductive metal film.

The metal film of the heat releasing layer has a high reflection rate. Thus, the heat releasing layer also functions as a reflection layer. Therefore, a reflection layer is not necessarily provided when the heat releasing layer is provided.

As long as the film arrangement shows super-resolution characteristics, the film arrangement of the super-resolution medium claimed in the present application is not limited to the above. For example, the film arrangement may be one described in Patent Documents, or may be film arrangements described in International Patent No. WO2002/058060 and so-called Super Lens, described in Appi. Phys. Lett, 73, 2078-2080.

Finally, blocks of the control section 19 of the optical information recording medium reproducing device 10 may be realized by way of hardware or software as executed by a CPU as follows.

The optical information recording medium reproducing device 10 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the optical information recording medium reproducing device 10 a computer-readable storage medium containing control program code (executable program, intermediate code program, or source program) of the control program of the control section 19 for the optical information recording medium reproducing device 10, which is software realizing the aforementioned functions, in order for the computer (or CPU, MPU) to retrieve and execute the program code contained in the storage medium.

The recording medium may be, for example, a tape, such as a magnetic tape or a cassette tape; a magnetic disk, such as a Floppy® disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The optical information recording medium reproducing device 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

As the optical information recording medium, various optical discs may be suggested, such as optical scanning discs such as CD-ROM (Compact Disk Read Only Memory), CD-R (Compact Disk Recordable), CD-RW (Compact Disk Rewritable), DVD-ROM (Digital Versatile Disk Read Only Memory), DVD-RW (Digital Versatile Disk Rewritable), BD (Blu-ray Disc), and BD (Blu-ray Disc)-ROM, magneto-optical discs, phase-change discs, and the like. The present invention is not limited to a particular recording type or a particular size of the optical information recording medium.

Furthermore, the optical information recording medium reproducing device encompasses a device only for reproduction or only for recording, as well as a device capable of carrying out both reproduction and recording. The optical information recording medium reproducing device may be portable type or non-portable type.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

A super-resolution optical information recording medium according to an embodiment of the present invention is preferably arranged such that the second area has a test write read area in which (i) information for adjusting laser light power for recording the content to the first area and (ii) information for adjusting laser light power for reproducing the content recorded in the first area are recordable; and recording marks in the test write read area are formed having a same recording density and modulation type as the recording marks to be formed in the first area.

In order to determine laser light power for recording contents (hereafter referred to as recording laser power), a conventional recording and reproducing device gradually raises recording laser power until a reproduction error specified by a standard is minimized. At a point the reproduction error is increased, the conventional recording and reproducing device determines that the recording laser power immediately before the increase is an optimum recording laser power.

Reproduction of a regular medium does not require determination of an optimum reproduction laser power for the reproducing device. This is because (i) the laser light power for reproducing contents (hereafter referred to as reproduction laser power) is standardized in accordance with a difference of laser power between reproducing devices, and (ii) reproduction characteristic of a regular medium is hardly dependent on the reproduction laser power unless the regular medium is broken or the like.

However, different to the regular medium, there are many cases with the super-resolution optical information recording medium where reproduction itself is impossible unless the reproduction laser power is optimized. Different to the conventional recording film and the like, an optimum reproduction laser power differs greatly depending on a type of reproduction layer, the reproduction layer thus causing super-resolution reproduction by utilization of the reproduction laser power. Therefore, with the super-resolution optical information recording medium, optimization of the reproduction laser power is required to be carried out concurrently with the optimization of the recording laser power, in a method as similar to the determination method of the aforementioned recording laser power.

Accordingly, a test write read area is further provided in the second area of a recordable/reproducible super-resolution optical information recording medium according to an embodiment of the present invention. In the test write read area, (i) laser light power to be used for recording contents to the first area and (ii) information which adjusts the laser light power to be used for reproducing contents in the first area are recorded, each in a same recording density and modulation type as the recording marks to be recorded in the first area. More specifically, for example, laser power to be used for recording is gradually raised, and a plurality of information is recorded to the write read area. Thereafter, each of the plurality of information is reproduced, while gradually raising the laser power to be used for the reproduction. As a result, a combination of a laser power to be used for recording and a laser power to be used for reproducing, in which a reproduction error is minimized, is obtained. That is to say, this obtained value is the optimum laser power to be used for recording and the optimum laser power to be used for reproducing, for the first area. As such, an effect is attained that information recording and information reproduction in the first area are appropriately carried out.

The test write read area is provided in the second area, therefore an effect is attained that the recording laser power and the reproduction laser power are adjusted without losing recording capacitance in the first area.

After information is recorded in the test write read area, the test write read area becomes a test read area. This is because no new information needs to be recorded in the test write read area, once information is recorded therein.

The super-resolution optical information recording medium according to the embodiment of the present invention, in addition to the above arrangement, is preferably arranged such that in the second area, the test write read area is provided at a position closer to the first area than the pre-pits are in which the medium identification information is recorded.

According to the arrangement, efficient information recording and/or information reproduction is possible. The following description explains a reason why the efficient information recording and/or information reproduction is possible, with reference to examples.

For example, a medium in which (i) a second area is provided at an inner circumferential part of the medium than a first area, and (ii) a test write read area is provided in the second area on an inner circumferential side of a pre-pit recorded with medium identification information (namely, a medium in which the test write read area is provided at a position far from the first area than the pre-pit recorded with the medium identification information), carries out reproduction in the following method. It is assumed that the medium already has contents recorded therein.

First, the reproducing device reproduces the medium identification information in order to identify a type of the medium. An optical head is moved to the test write read area provided on the further inner circumferential side of the medium, whereby a test write read is carried out. This determines recording laser power, reproduction laser power and the like. Thereafter, again, the optical head is moved to the first area provided on an outer circumferential side of pre-pits in which the medium identification information is recorded, whereby contents recorded in the first area is reproduced. As such, the reproducing device requires the optical head to reciprocate in order to start reproduction, if the test write read area is provided in the second area at a position far from the first area than the pre-pits are in which the medium identification information is recorded. As a result, problems occur that (i) reproduction start-up time is increased, and (ii) breakage rate of the reproducing device caused by complex movement of the optical head is increased.

In comparison, the optical head just requires to move in one direction if the test write read area is provided in the second area at a position closer to the first area than the pre-pits are in which the medium identification information is recorded, as in the embodiment of the present invention. Thereby, the optical head does not need to make any complex movements. Therefore, an effect is attained that reproduction start-up time is shortened, and breakage rate of the reproducing device is reduced.

The above description explains a case where the test write read area is provided closer to the first area than the pre-pits are in which the medium identification information is recorded, in a radius direction. However, it is not limited to this, and the same applies for a case where the test write read area is provided closer to the first area in a direction in which the pre-pits are arranged (same direction as a direction in which reproduction is carried out). The same also applies for the following description which describes pre-pits provided close to or far from the first area.

The super-resolution optical information recording medium according to an embodiment of the present invention is preferably arranged such that, in addition to the above arrangement, in the second area, reproduction speed information for reproduction of the content in the first area is recorded, by use of pre-pits that are formed by concave portions and/or protrusions and that are not shorter than the resolution limit of the optical system in the reproducing device; and the pre-pits in which the reproduction speed information is recorded are provided at a position far from the first area than the test write read area is.

According to the arrangement, a recordable/reproducible super-resolution optical information recording medium according to an embodiment of the present invention can reproduce reproduction speed information by use of reproduction laser power optimum for a regular optical information recording medium.

The reproduction speed information encompass (i) so-called reproduction information required to obtain an analog waveform which can be digitized, when an appropriate reproduction laser is irradiated, and (ii) digital processing information required in order to digitize an analog waveform reproduced so as to reproduce contents and the like.

The reproduction information includes, for example, reproduction speed range information. The reproduction speed range information is information for specifying reproduction speed in order to stably obtain an analog waveform based on super-resolution reproduction. This is because in a case where the super-resolution reproduction is possible by use of heat, if the reproduction speed is too fast, super-resolution reproduction is impossible because of insufficient heat, whereas if the speed is too slow, the heat energy to be generated is too great, thereby causing damage to the medium.

The digital processing information includes, for example, reproduction clock switching information and reproduction speed switching information. The reproduction clock switching information and the reproduction speed switching information are information required in order to digitize an obtained analog waveform, when random patterns (later described in details) having different recording densities is reproduced. More details are later described.

In the embodiment of the present invention, the above arrangement allows, in the second area, determination of reproduction laser power to be used for reproducing contents recorded in the first area, provided that the reproduction speed information is obtained. Specifically, it is possible to digitize an analog waveform obtained in a reproduction speed at which stable super-resolution reproduction can be attained, in a state adapted to a recording density of the test write read area. Therefore, an effect is attained that no mistakes occur in the determination of the reproduction laser power.

The reproduction speed denotes a linear velocity in reproduction (a relative velocity of the optical head in a reproduction position reproducing direction, due to rotation of the medium caused by the spindle motor in order to reproduce the medium).

It is possible to appropriately digitize the analog waveform obtained at a reproduction speed at which stable super-resolution reproduction can be attained, even in reproduction of the contents recorded in the first area. Therefore, it is possible to stably reproduce the contents.

The super-resolution optical information recording medium according to an embodiment of the present invention, in addition to the arrangement, is preferably arranged such that in the second area, recording condition information for recording the content to the first area is recorded, by use of pre-pits that are formed by concave portions and/or protrusions and that are not shorter than the resolution limit of the optical system in the reproducing device; and the pre-pits in which the recording condition information is recorded are provided at a position far from the first area than the test write read area is.

According to the arrangement, the recordable/reproducible super-resolution optical information recording medium according to an embodiment of the present invention is capable of reproducing the recording condition information by use of reproduction power optimum for a regular optical information recording medium.

In addition, an effect is attained that a reproduction laser power can be determined at the test write read area based on the recording condition information, and as a result, a determination mistake of the reproduction laser power does not occur. The recording condition information includes not only the recording laser power, but also removal laser power to be used for forming the recording marks, a pulse width and a timing of a laser, and the like.

The super-resolution optical information recording medium according to an embodiment of the present invention, in addition to the above arrangement, is preferably arranged such that in the second area, area position information for specifying a position in the first area is recorded, by use of pre-pits that are formed by concave portions and/or protrusions and that have a same recording density and modulation type as the recording marks in the first area; and the pre-pits in which the area position information is recorded are provided at a position closer to the first area than the test write read area is.

According to the arrangement, for example, after the determination of the reproduction laser power, reproduction of the area position information without making any changes to the determined reproduction laser power may be carried out. This simplifies the movement of the optical head (movement in one direction). Thus, an effect is attained that efficient information recording and/or information reproduction is possible. In addition, according to the arrangement, the second area can be made narrow, and the first area be made broad, thereby attaining an effect that information recording capacitance is increased as a result.

The super-resolution optical information recording medium according to an embodiment of the present invention, in addition to the above arrangement, is preferably arranged such that a track pitch of the first area is same as or narrower than a track pitch of the second area.

According to the arrangement, the recordable/reproducible super-resolution optical information recording medium has a track pitch of the first area the same as or narrower than a track pitch of the second area.

When the track pitch of the first area and the track pitch of the second area are the same, it is not possible to increase the number of tracks in the first area, however an effect is attained that density of recorded information is increasable without providing a mechanism for changing the track pitch. On the other hand, when the track pitch of the first area is made narrower than the track pitch of the second area, it is possible to increase the number of tracks in the first area. Therefore, an effect is attained that the density of the recorded information is further increasable. However, in order to increase the density, a mechanism which makes changes to the track pitch is required to be provided to the reproducing device.

The super-resolution optical information recording medium according to an embodiment of the present invention is preferably arranged such that the second area has a test read area in which pre-pits are formed by concave portions and/or protrusions, which pre-pits adjust laser light power for reproducing the content in the first area, the pre-pits of the test read area are formed in a same recording density and modulation type as the pre-pits in the first area.

As described above, optimization of reproduction laser power is necessary in a super-resolution optical information recording medium.

Accordingly, in a super-resolution optical information recording medium only for reproduction according to an embodiment of the present invention, a test read area is further provided in the second area of the super-resolution optical information recording medium, and in the test read area, pre-pits are formed by concave portions and/or protrusions, which pre-pits adjust laser light power for reproducing the content recorded in the first area. Thus, an effect is attained that information reproduction is appropriately carried out in the first area.

The test read area is provided in the second area, therefore an effect is attained that reproduction laser power is adjusted without losing recording capacitance of the first area.

The pre-pits in the test read area may be longer than a shortest pre-pit length in the pre-pits in the first area but shorter than a longest pre-pit length in the pre-pits in the first area. This eliminates a need to carry out determination processing of the reproduction errors in order to determine optimum reproduction power. As a result, an effect is attained that an optimum reproduction power is quickly determined, and a start-up time of a reproducing device is shortened. The reason why the optimum reproduction power is more quickly determined due to having the pre-pits longer than the shortest pre-pit length in the pre-pits in the first area but shorter than the longest pre-pit length in the pre-pits in the first area, is described in the embodiments.

The test read area is provided in the second area, therefore an effect is attained that reproduction power of the first area is quickly adjusted.

The super-resolution optical information recording medium according to an embodiment of the present invention, in addition to the above arrangement, is arranged such that in the second area, the test read area is provided at a position closer to the first area than the pre-pits are in which the medium identification information is recorded.

According to the arrangement, efficient information recording and/or information reproduction is possible. The following description explains its reason with reference to an example.

For example, a medium in which (i) a second area is provided at an inner circumferential part of the medium than the first area, and (ii) a test read area is provided in the second area on an inner circumferential side of a pre-pit recorded with medium identification information (namely, a medium in which the test read area is provided at a position far from the first area than the pre-pits are in which the medium identification information is recorded), carries out reproduction in the following method.

First, the reproducing device reproduces the medium identification information in order to identify a type of the medium. An optical head is moved to the test read area provided on a further inner circumferential side of the medium, by which a test read is carried out. This determines reproduction laser power and the like. Thereafter, the optical head is moved to the first area provided on an outer circumferential side of the pre-pits in which the medium identification information is recorded, by which the content recorded in the first area is reproduced. As such, the reproducing device requires the optical head to reciprocate in order to start reproduction, if the test read area is provided in the second area at a position far from the first area than the pre-pits are in which the medium identification information is recorded. As a result, problems occur that (i) reproduction start-up time is increased, and (ii) breakage rate of the reproducing device caused by complex movement of the optical head is increased.

In comparison, the optical head just requires to move in one direction if the test read area is provided in the second area at a position closer to the first area than the pre-pits are in which the medium identification information is recorded, as in the embodiment of the present invention. Thereby, the optical head does not need to make any complex movements. Therefore, an effect is attained that reproduction start-up time is shortened, and breakage rate of the reproducing device is reduced.

The above description explains a case where the test read area is provided closer to the first area than the pre-pits are in which the medium identification information is recorded, in a radius direction. However, it is not limited to this, and the same applies for a case where the test read area is provided closer to the first area in a direction in which the pre-pits are arranged (same direction as a direction in which reproduction is carried out). The same also applies for the following description which describes pre-pits provided close to or far from the first area.

The super-resolution optical information recording medium according to an embodiment of the present invention, in addition to the above arrangement, is arranged such that in the second area, reproduction speed information for reproduction of the content recorded in the first area is recorded, by use of pre-pits that are formed by concave portions and/or protrusions and that are not shorter than the resolution limit of the optical system in the reproducing device, the pre-pits thus recorded with the reproduction speed information are provided at a position far from the first area than the test read area is.

According to the arrangement, the super-resolution optical information recording medium only for reproduction according to an embodiment of the present invention is capable of reproducing the reproduction speed information by use of reproduction laser power optimum for a regular optical information recording device.

The reproduction speed information encompass (i) so-called reproduction information required to obtain an analog waveform which can be digitized, when an appropriate reproduction laser is irradiated, and (ii) digital processing information required in order to digitize an analog waveform reproduced so as to reproduce contents and the like.

The reproduction information includes, for example, reproduction speed range information. The reproduction speed range information is information for specifying reproduction speed in order to stably obtain an analog waveform based on super-resolution reproduction. This is because in a case where the super-resolution reproduction is possible by use of heat, if the reproduction speed is too fast, super-resolution reproduction is impossible because of insufficient heat, whereas if the speed is too slow, the heat energy to be generated is too great, thereby causing damage to the medium.

The digital processing information includes, for example, reproduction clock switching information and reproduction speed switching information. The reproduction clock switching information and the reproduction speed switching information are information required in order to digitize an obtained analog waveform, when random patterns (later described in details) having different recording densities is reproduced. More details are later described.

In the embodiment of the present invention, the above arrangement allows, in the second area, determination of reproduction laser power to be used for reproducing contents recorded in the first area, provided that the reproduction speed information is obtained. Specifically, it is possible to digitize the analog waveform obtained at a reproduction speed at which stable super-resolution reproduction can be attained, in a state adapted to the recording density of the test read area. Therefore, an effect is attained that no mistakes occur in the determination of the reproduction laser power.

The reproduction speed denotes a linear velocity in reproduction (a relative velocity of the optical head in a reproduction position reproducing direction, due to rotation of the medium caused by the spindle motor in order to reproduce the medium).

It is possible to appropriately digitize the analog waveform obtained at a reproduction speed at which stable super-resolution reproduction can be attained, even in reproduction of the contents recorded in the first area. Therefore, it is possible to stably reproduce the contents.

The super-resolution optical information recording medium according to an embodiment of the present invention, in addition to the above arrangement, is arranged such that in the second area, area position information for specifying a position in the first area is recorded in the second area, by use of pre-pits that are formed by concave portions and/or protrusions and that have a same recording density and modulation type as the recording marks in the first area, the pre-pits in which the area position information is recorded are provided at a position closer to the first area than the test read area is.

According to the arrangement, for example, after the determination of the reproduction laser power, reproduction of the area position information without making any changes to the determined reproduction laser power may be carried out. This simplifies the movement of the optical head (movement in one direction). Thus, an effect is attained that efficient information recording and/or information reproduction is possible. In addition, according to the arrangement, the second area can be made narrow, and the first area be made broad, thereby attaining an effect that information recording capacitance is increased as a result.

A medium unique number adopted in DVD (Digital Versatile Disk) and the like used for copy protection is different for each manufactured medium. Therefore, the medium unique number cannot be formed by compression molding of highly productive substrates as like the pre-pits, and is usually created by forming a groove section on the substrate by a laser or the like, at the end of manufacturing the medium.

A wavelength of a significant output laser to be used in order to create the medium unique signal increases in cost if the wavelength is of a short wavelength, as like one used in optical disc reproduction. Therefore, usually, the wavelength is made longer than the one used in the optical disc reproduction (the wavelengths are long, therefore a small groove section obviously cannot be made). In addition, since a groove section is formed by use of significant power laser, the medium unique signal has damage in the first place. Therefore, there is a high possibility that reproduction by use of high laser power which readily gives damage may cause reproduction deterioration of the medium unique signal. As such, the reproduction of the medium unique signal is preferably carried out by use of low laser power.

The super-resolution optical information recording medium according to an embodiment of the present invention, in addition to the above arrangement, is preferably arranged such that in the second area, unique number presence/absence information for determining whether a unique number is present or absent is recorded, by use of pre-pits that are formed by concave portions and/or protrusions and that are not shorter than the resolution limit of the optical system in the reproducing device, the pre-pits in which the unique number presence/absence information is recorded are provided at a position far from the first area than the test read area is.

According to the present embodiment, the super-resolution optical information recording medium only for reproduction according to an embodiment of the present invention is capable of reproducing a medium unique number by use of reproduction laser power optimum for a regular optical information recording medium, that is, low laser power. Therefore, the medium unique signal is securely reproduced. In addition, no wasteful switching of laser power is carried out. Thus, an effect is attained that efficient information recording and/or information reproduction is possible.

The super-resolution optical information recording medium according to an embodiment of the present invention, in addition to the arrangement, is preferably arranged such that a track pitch of the first area is same as or narrower than a track pitch of the second area.

According to the arrangement, the super-resolution optical information recording medium only for reproduction according to the embodiment of the present invention has a track pitch in the first area the same or narrower than a track pitch of the second area.

When the track pitch of the first area and the track pitch of the second area are the same, it is not possible to increase the number of tracks in the first area, however an effect is attained that density of the recorded information is increasable without providing a mechanism for changing the track pitch. On the other hand, when the track pitch of the second area is made narrower than the first area, it is possible to increase the number of tracks in the first area. Therefore, an effect is attained that density of the recorded information further increasable. However, in order to increase the density, a mechanism which makes changes to the track pitch is required to be provided to the reproducing device.

The super-resolution optical information recording medium according to an embodiment of the present invention preferably further includes: a substrate on which the first area is provided; and at least a recording layer and a super-resolution reproducing layer layered on the substrate in this order, the super-resolution reproducing layer being a metal oxide film.

The super-resolution optical information recording medium according to an embodiment of the present invention preferably further includes: a substrate on which the first area is provided; and at least a super-resolution reproduction layer and a recording layer layered on the substrate in this order, the super-resolution reproduction layer being a metal oxide film.

According to the arrangement, a film arrangement of a recordable/reproducible super-resolution optical information recording medium according to an embodiment of the present invention may be of a DVD type or a BD (Blu-ray Disc) type. Since the super-resolution reproducing layer is a metal oxide film which has thermal resistance, an effect is attained that reproduction durability of the super-resolution optical information recording medium is improved.

The super-resolution optical information recording medium according to an embodiment of the present invention preferably further includes: a substrate on which the first area and the second area are provided; and at least a reflection layer and a super-resolution reproducing layer layered on the substrate in this order, the super-resolution reproducing layer being a metal oxide film.

The super-resolution optical information recording medium according to an embodiment of the present invention preferably further includes: a substrate on which the first area and the second area are provided; and at least a super-resolution reproducing layer and a reflection layer layered on the substrate in this order, the super-resolution reproducing layer being a metal oxide film.

The super-resolution optical information recording medium according to an embodiment of the present invention preferably further includes: a substrate on which the first area and the second area are provided; and at least a light absorbing layer and a super-resolution reproducing layer layered on the substrate in this order, the light absorbing layer absorbing reproduction light and converting the reproduction light to heat, and the super-resolution reproducing layer being a metal oxide film.

The super-resolution optical information recording medium according to an embodiment of the present invention preferably further includes: a substrate on which the first area and the second area are provided; and at least a super-resolution reproducing layer and a light absorbing layer layered on the substrate in this order, the light absorbing layer absorbing reproduction light and converting the reproduction light to heat, and the super-resolution reproducing layer being a metal oxide film.

According to the arrangement, a film arrangement of a recordable/reproducible super-resolution optical information recording medium according to an embodiment of the present invention may be of a DVD type or a BD (Blu-ray Disc) type. Since the super-resolution reproducing layer is a metal oxide film which has thermal resistance, an effect is attained that reproduction durability of the super-resolution optical information recording medium is improved.

Furthermore, of the super-resolution optical information recording mediums only for reproduction, in a case of the arrangement including the light absorbing layer, an effect is attained that reproduction durability is further improved, because of a decrease in requirement of the super-resolution reproduction layer to absorb the reproduction laser and generate heat by the super-resolution reproduction layer itself. Even if the reproduction light power is set low, it is possible to cause the temperature to rise in order to attain the super-resolution characteristic, thereby the effect is attained that electricity consumption is reduced in reproduction.

The super-resolution optical information recording medium according to an embodiment of the present invention is preferably arranged such that the metal oxide film is an inorganic film which is made from titanium oxide, cerium oxide, zinc oxide, or whose main component is titanium oxide, cerium oxide, or zinc oxide.

According to the arrangement, the reproduction durability improves, and further excellent super-resolution characteristics are attained. Thus, an effect is attained that reproduction of high density recorded information is carried out.

The super-resolution optical information recording medium according to an embodiment of the present invention is preferably arranged such that the light absorbing layer is made from Si, Ge, or an alloy whose main component is Si and/or Ge.

According to the arrangement, if the light absorbing layer is made from Si, Ge, or an alloy whose main component is Si or Ge, reproduction durability further improves, thereby attaining an effect that electrical consumption is reduced in reproduction.

The super-resolution optical information recording medium according to an embodiment of the present invention preferably includes a heat releasing layer for releasing the heat generated due to the irradiation of the reproduction light.

According to the arrangement, it is possible to prevent accumulation of excess heat generated due to the irradiation of the reproduction light. As a result, reproduction durability further improves, and a further highly reliable signal reproduction is carried out.

An optical information recording medium reproducing device according to an embodiment of the present invention further preferably includes power control means for controlling the reproduction light power from the reproduction means so that reproduction is carried out by use of the reproduction light power suitable for reproduction of the super-resolution optical information recording medium, in the case the optical information medium is identified as the super-resolution information recording medium, as a result of the identification by the medium identification means.

With this arrangement, the reproduction device is capable of accurately switching the reproduction light power to a suitable reproduction light power in accordance with a provided optical information recording medium. Thus, an effect is attained such that appropriate reproduction is carried out in the reproduction of the regular optical information recording medium and the super-resolution optical information recording medium. Switching of the reproduction light power can be quickly carried out, therefore it is possible to shorten the required amount of time for the reproducing device to start-up.

The optical information recording medium reproducing device according to an embodiment of the present invention, in addition to the above arrangement, is preferably arranged such that the power control means controls the reproduction light power of the reproduction means based on an amplitude of a reproduction signal read out from a pre-pit in the test read area in the super-resolution optical information recording medium.

Thus, in order to determine an optimum reproduction power, it is not necessary to carry out a determination process of reproduction errors which is carried out in a reproduction power determination method of a conventional reproducing device. As a result, the optimum reproduction power is quickly determined, thereby attaining the effect that a start-up time of the reproducing device is shortened.

The optical information recording medium reproducing device according to an embodiment of the present invention, in addition to the arrangement, further preferably includes clock control means for controlling a reproducing clock so that the reproduction is carried out by use of a reproduction clock suitable for the super-resolution optical information recording medium, in the case where the optical information recording medium is identified as the super-resolution optical information recording medium, as a result of the identification by the medium identification means.

By having the above arrangement, the reproducing device can accurately switch the reproduction clock to a suitable reproduction clock in accordance with a provided optical information recording medium, therefore reproduction can be carried out in an optimistic state when the regular optical information recording medium and the super-resolution optical information recording medium are reproduced.

A method for controlling an optical information recording medium reproducing device according to an embodiment of the present invention is capable of reproducing (i) the super-resolution optical information recording medium, and (ii) a regular optical information recording medium which is an optical information recording medium in which recording marks or pre-pits are not shorter than the resolution limit of the optical system, the method including: acquiring medium identification information by use of reproduction light power suitable for reproduction of the regular optical information recording medium; and identifying whether or not the optical information recording medium is a super-resolution optical information recording medium, based on the medium identification information thus acquired.

According to the method, the reproducing device can identify whether or not the provided optical information recording medium is the super-resolution optical information recording medium by use of the reproduction light power suitable for the regular optical information recording medium, accurately and with ease.

The control means of the optical information recording medium reproducing device may be carried out in a computer by running a control program of the optical information recording medium reproducing device. Furthermore, by storing the control program of the optical information recording medium reproducing device in a computer-readable recording medium, it is possible to process the control program of the optical information recording medium reproducing device on an arbitrary computer.

INDUSTRIAL APPLICABILITY

*207 A super-resolution medium according to the present invention is useful for various optical discs such as optical scanning discs, magneto-optical discs, and phase-change discs, however is also applicable to information recording mediums which have recording marks that are shorter than a length of a resolution limit, such as a magnetic disc.

The invention claimed is:

1. A method for reproducing an optical information recording medium, the optical information recording medium comprising:
a first area in which a content is recorded by forming recording marks, one or more of the recording marks being shorter than a length of a resolution limit of an optical system in a reproducing device; and
a second area in which medium identification information for specifying a type of the medium is recorded as a form of concavities and/or convexities formed during production of the optical information recording medium,
the concavities and/or convexities as a form of which the medium identification information is recorded, being not shorter than the resolution limit of the optical system,
in the second area, (i) information for determining reproduction laser power and (ii) information each being further recorded, as a form of concavities and/or convexities that are not shorter than the resolution limit of the optical system in the reproducing device, the information (ii) being information for determining a linear velocity in reproduction of the content recorded in the first area so that digital processing is carried out with respect to the content by use of a reproduction clock which is identical to a reproduction clock that is used to carry out digital processing with respect to the second area,
the first area having a track pitch which is narrower than a track pitch of the second area,
the method comprising the steps of:
in reproducing information recorded in the first area in the optical information recording medium,
(a) after having read out, from the second area, the information for determining a linear velocity, in order to allow digitalization of the analogue waveform obtained during reproduction of the information recorded in the first area, based on the information for determining a linear velocity, determining a linear velocity so that digital processing is carried out with respect to the first area by retaining the reproduction clock that is used to carry out digital processing with respect to the second area and using the reproduction clock thus retained; and
(b) after having read out, from the second area, the information for determining reproduction laser power, determining reproduction laser power based on the information for determining reproduction laser power.

2. A method for reproducing an optical information recording medium, the optical information recording medium comprising:
a first area in which a content is recorded by use of concave portions and/or protrusions formed during production of the optical information recording medium, one or more of the concave portions and/or protrusions being shorter than a length of a resolution limit of an optical system in a reproducing device; and
a second area in which medium identification information for specifying a type of the medium is recorded as a form of concavities and/or convexities formed during production of the optical information recording medium,
the concavities and/or convexities as a form of which the medium identification information is recorded, being not shorter than the resolution limit of the optical system,
in the second area, (i) information for determining reproduction laser power and (ii) information each being further recorded, as a form of concavities and/or convexities that are not shorter than the resolution limit of the optical system in the reproducing device, the information (ii) being information for determining a linear velocity in reproduction of the content recorded in the first area so that digital processing is carried out with respect to the content by use of a reproduction clock which is identical to a reproduction clock that is used to carry out digital processing with respect to the second area,
the first area having a track pitch which is narrower than a track pitch of the second area,
the method comprising the steps of:
in reproducing information recorded in the first area in the optical information recording medium,
(a) after having read out, from the second area, the information for determining a linear velocity, in order to allow digitalization of the analogue waveform obtained during reproduction of the information recorded in the first area, based on the information for determining a linear velocity, determining a linear velocity so that digital processing is carried out with respect to the first area by retaining the reproduction clock that is used to carry out digital processing with respect to the second area and using the reproduction clock thus retained; and
(b) after having read out, from the second area, the information for determining reproduction laser power, determining reproduction laser power based on the information for determining reproduction laser power.

* * * * *